US006513353B1

(12) United States Patent
Weinerman et al.

(10) Patent No.: US 6,513,353 B1
(45) Date of Patent: Feb. 4, 2003

(54) LOCKABLE PADDLE HANDLE WITH DISCONNECT FEATURE FOR OPERATING REMOTELY LOCATED LATCHES

(75) Inventors: Lee S. Weinerman, Medina, OH (US); Scott A. Arthurs, Brunswick, OH (US)

(73) Assignee: The Eastern Company, Cleveland, OH (US)

( * ) Notice: Subject to any disclaimer, the term of this patent is extended or adjusted under 35 U.S.C. 154(b) by 0 days.

(21) Appl. No.: 09/481,145

(22) Filed: Jan. 12, 2000

Related U.S. Application Data

(60) Provisional application No. 60/115,797, filed on Jan. 12, 1999.

(51) Int. Cl.[7] .................. B60R 25/02

(52) U.S. Cl. .................. 70/208; 70/472; 292/48; 292/DIG. 31

(58) Field of Search .................. 70/208, 467, 472, 70/489; 292/34, 36, 48, DIG. 31, 336.3, 337

(56) References Cited

U.S. PATENT DOCUMENTS

| | | | | |
|---|---|---|---|---|
| 2,445,187 | A | 7/1948 | Roethel | 292/164 |
| 3,121,579 | A | 2/1964 | Salvo et al. | 292/48 |
| 3,923,329 | A | 12/1975 | Torii et al. | 292/216 |
| 4,312,202 | A | 1/1982 | Pastva, Jr. et al. | 70/472 |
| 4,312,204 | A | 1/1982 | Davis | 70/472 |
| 4,312,205 | A | 1/1982 | Reed et al. | 70/472 |
| 4,320,642 | A | 3/1982 | Pastva, Jr. | 70/472 |
| 4,321,812 | A | 3/1982 | Pelcin | 70/472 |
| 4,335,595 | A | 6/1982 | Swan et al. | 70/149 |
| 4,896,906 | A | 1/1990 | Weinerman et al. | 292/48 |
| 4,911,487 | A | 3/1990 | Rachocki | 292/216 |
| 4,917,412 | A | 4/1990 | Swan et al. | 292/48 |
| 5,069,491 | A | 12/1991 | Weinerman et al. | 292/48 |
| 5,117,665 | A | 6/1992 | Swan et al. | 70/264 |
| 5,299,844 | A | 4/1994 | Gleason | 292/240 |
| 5,439,260 | A | 8/1995 | Weinerman et al. | 292/48 |
| 5,564,295 | A | 10/1996 | Weinerman et al. | 70/208 |
| 5,586,458 | A | 12/1996 | Weinerman et al. | 70/208 |
| 5,595,076 | A | 1/1997 | Weinerman et al. | 70/208 |
| 5,611,224 | A | 3/1997 | Weinerman et al. | 70/208 |
| 5,667,260 | A | 9/1997 | Weyerstall | 292/201 |
| 5,844,470 | A | 12/1998 | Garnault et al. | 340/426 |
| 5,884,948 | A | 3/1999 | Weinerman et al. | 292/216 |
| 5,941,104 | A | 8/1999 | Sadler | 70/208 |

*Primary Examiner*—Suzanne Dino Barrett
(74) *Attorney, Agent, or Firm*—David A. Burge

(57) ABSTRACT

A flush mountable operating assembly has paddle-type handle nested in a housing-defined recess for pivoting between non-operated and operated positions. An operating linkage for drivingly connecting the paddle handle to one or a plurality of adjacent or remotely located latch assemblies includes overlying first and second arm that are connected to the housing for pivotal movement about a common pivot axis. A lock cylinder is carried by the housing and is coupled to a connecting element for positioning the connecting element at selected locations along the lengths of aligned slots that are formed through the first and second arms. The position of the connecting element in the slots, and the configuration and orientation of the slots determine whether the arms are drivingly connected or disconnected. When connected, the arms pivot in the unison when the handle is moved to its operated position to cause the latch operation.

38 Claims, 21 Drawing Sheets

LOCKABLE PADDLE HANDLE WITH DISCONNECT FEATURE FOR OPERATING REMOTELY LOCATED LATCHES

REFERENCE TO PROVISIONAL APPLICATION

This application claims the benefit of U.S. provisional application Ser. No. 60/115,797 entitled LOCKABLE PADDLE HANDLE LATCH OPERATOR WITH DISCONNECT FEATURE filed Jan. 12, 1999 by Lee S. Weinerman et al, the disclosure of which is incorporated herein by reference.

BACKGROUND OF THE INVENTION

1. Field of the Invention

The present invention relates to a flush mountable, paddle handle "operator" or "operating assembly" for operating one or a plurality of adjacent or remotely located latch assemblies, wherein a key-operated lock cylinder or the like is carried by the housing of the operating assembly for positioning a slot-carried connecting element to selectively drivingly connect and disconnect a pair of adjacent linkage elements of the operating assembly to enable and disable the paddle handle from operating the latch assemblies. More particularly, the present invention relates to a lockable paddle handle latch operator having a lock cylinder that is accessible from the front of the operating assembly for controlling the position of a connecting element that is movable within aligned slots formed through a pair of overlying arms that pivot about a common axis at the rear of the operating assembly, with the position of the connecting element in the slots, and the configuration and orientation of the slots determining whether the arms are drivingly connected to pivot in unison to cause latch operation in response to pivoting of the paddle handle to its operated position, or are disconnected so that pivotal movement of the first arm by the paddle handle causes no corresponding latch operating movement of the second arm.

Two invention embodiments are disclosed herein. A first embodiment shown in FIGS. 1–13 employs this "linkage disconnect" locking arrangement in a paddle handle operating assembly that operates a single, adjacently located ratary latch. A second embodiment shown in FIGS. 14–16 employs this "linkage disconnect" locking arrangement in a paddle handle operating assembly that operates a plurality of remotely located latch assemblies.

2. Prior Art

Flush mountable lock operating mechanisms that employ paddle-type handles nested within pan-shaped housings, and that have linkages for operating one or a plurality of adjacent or remotely located latch assemblies are known. These so called "paddle handle" operating assemblies have been manufactured since the mid-part of the twentieth century for use on the utility cabinets of industrial service vehicles, and for other applications, and now are commercially available in a wide variety of configurations from a number of manufacturers.

Many of the known types of paddle handle operating assemblies include 1) a flush-mountable housing having a forwardly-facing recess that nests a paddle handle that is pivotally connected to the housing for movement between handle non-operated and handle operated positions; 2) a key or combination operated lock cylinder mounted in a hole formed through the flush-mountable housing, which is accessible from the front of the housing for being "locked" and "unlocked;" and, 3) an operating linkage located behind the housing for drivingly connecting the operating handle to one or more latch assemblies to operate the latch assemblies in response to movement of the paddle handle from its non-operated to its operated position, except when the lock cylinder is "locked."

One known technique for preventing the operation of such a paddle handle operating assembly when its lock cylinder is "locked" is to provide the lock cylinder with a cam that is positionable to block some essential movement of an operating linkage element. This "direct blockage" approach is often relatively inexpensive to implement, and is widely used. Where this locking technique is utilized, the fact that an essential operating linkage movement is blocked when the unit is locked usually also means that that the paddle handle is prevented from being moved out of its non-operated position when the unit is locked. A resulting drawback is the possibility that the operating assembly may be damaged or defeated if efforts are made to force the paddle handle to move to its operated position when the unit is locked.

Another known technique for preventing operation of a paddle handle operating assembly from unlatching one or more latch assemblies when the lock cylinder of the operating assembly is "locked" is to provide the operating assembly with a so called "disconnect" feature. This approach usually involves an addition to the operating assembly of some mechanism for selectively disabling an essential driving connection between elements of the linkage that couples the paddle handle to such latch assemblies as are operated by the paddle handle—a disconnect mechanism that is operated by the lock cylinder of the operating assembly. When the lock cylinder is "unlocked," the essential driving connection is established; and, when the lock cylinder is "locked," the essential driving connection is disabled.

An advantage of the "linkage disconnect" locking approach just described is that, when the operating assembly is locked, the paddle handle is completely disconnected from the latch or latches that it normally operates—hence, movement of the paddle handle will do nothing to operate the latch assemblies. Because attempts to force the handle in an effort to operate the latches will accomplish little, operating assemblies that utilize the "linkage disconnect" approach tend to suffer little in the way of damage or defeat due to being forced.

Patents that show how the "linkage disconnect" locking technique has been incorporated in paddle handle operating assemblies that have housing-carried lock cylinders (referred to hereinafter as the "Disconnect Patents") include:

1) U.S. Pat. No. 4,312,202 issued Jan. 26, 1982 to John V. Pastva, Jr., et al, entitled PADDLE LOCK WITH BOLT-CARRIED HANDLE DISCONNECT MEMBER;

2) U.S. Pat. No. 4,312,204 issued Jan. 26, 1982 to Edwin W. Davis, entitled PADDLE LOCK WITH TRANSLATABLY MOUNTED HANDLE DISCONNECT MEMBER;

3) U.S. Pat. No. 4,312,205 issued Jan. 26, 1982 to James A. Reed et al, entitled PADDLE LOCK WITH ROTATABLY MOUNTED HANDLE DISCONNECT MEMBER;

4) U.S. Pat. No. 4,320,642 issued Mar. 23, 1982 to John V. Pastva, Jr., entitled PADDLE LOCKS WITH HANDLE DISCONNECT FEATURES;

5) U.S. Pat. No. 4,321,812 issued Mar. 30, 1982 to Albert L. Pelcin, entitled PADDLE LOCK WITH PIVOTALLY MOUNTED HANDLE DISCONNECT MEMBER; and, 6) U.S. Pat. No. 4,335,595 issued Jun. 22, 1982 to Jye P. Swan et al, entitled PADDLE LOCK WITH HANDLE DISCONNECT.

While the proposals of the Disconnect Patents have provided workable solutions in some applications where "disconnect linkage" locking has been desired, the solutions offered by these patents have been found to be best suited for use with so called "paddle locks" of the spring-projected-bolt type that have their latch bolts slidably mounted on the same flush-mountable housings that pivotally mount the paddle handles of these units. Not addressed by the Disconnect Patents is a long-standing need for a relatively simple approach that can be taken to provide other types of paddle-handle operated latch assemblies with a "linkage disconnect" locking system. The need remains for a simple, versatile "linkage disconnect" locking system that can be incorporated into the operating linkages of paddle-handle operating assemblies to provide "linkage disconnect" locking in place of the "direct blockage" locking systems currently being used by these operating assemblies.

Two examples of paddle-handle operating assemblies that can be rendered more resistant to damage and defeat (due to forcing of their paddle handles) if their "direct blockage" locking systems could be replaced by "linkage disconnect" locking systems are provided by the following patents:

1) U.S. Pat. No. 5,586,458 issued Dec. 24, 1996 to Lee S. Weinerman et al, entitled HANDLE OPERABLE ROTARY LATCH AND LOCK; and, 2) U.S. Pat. No. 5,595,076 issued Jan. 21, 1997 to Lee S. Weinerman et al, entitled HANDLE OPERABLE TWO-POINT LATCH AND LOCK.

The first of these two patents discloses a relatively simple operating assembly having a rotary latch assembly connected directly to the flush-mountable housing of the operating assembly. A first invention embodiment shown in FIGS. 1–13 hereof addresses the need to provide this type of paddle-handle operating assembly with disconnect features.

The second of these patents discloses a more complex, modular type of operating assembly that has its components carried partially by the flush-mountable housing and partially by a mounting bracket that is used to clamp the flush-mountable housing in place—an operating assembly that is configured to operate a plurality of remotely located latch assemblies that typically are of the slide-bolt or rotary type. A second invention embodiment shown in FIGS. 14–38 hereof addresses the need to provide this type of paddle-handle operating assembly with disconnect features.

SUMMARY OF THE INVENTION

The present invention offers a simple way of providing the operating linkage of a paddle handle operating assembly with "linkage disconnect" locking.

The approach taken is to include within the operating linkage (i.e., the linkage that drivingly connects the paddle handle to one or more latch assemblies for operating the latch assemblies) a pair of overlying arms that pivot about a common axis. One of the arms is coupled to the paddle handle for being pivoted when the paddle handle is pivoted. The other of the arms is coupled to one or more latch assemblies for operating the latch assemblies in the event that both of the overlying arms are pivoted, in unison, by the paddle handle. Wilether the arms are drivingly connected to pivot in unison is controlled 1) by utilizing a lock cylinder to selectively position a connecting element along the length of aligned slots formed through the overlying arms between "locked" and "unlocked" positions, and 2) by configuring and orienting the slots so that, a) when the connecting element is moved to its "unlocked" position by the lock cylinder, the connecting element provides a driving connection between the overlying arms that will cause the arms to pivot in unison to cause latch operation in response to pivotal movement of the operating handle from its non-operated position to its operated position, and b) when the connecting element is moved to its "locked" position by the lock cylinder, the connecting element "disconnects" the arms (i.e., the connecting element fails to provide a driving connection between the overlying arms) whereby pivotal movement of the first arm by the paddle handle will not cause corresponding latch-operating movement of tile second arm.

An interesting feature of the present invention is that it contemplates two very different approaches that can be taken to render the connecting element incapable of establishing a driving connection between the first and second arms when the connecting element is moved to its "locked" position:

1) One approach relies more on slot configuration than on slot orientation and positioning to accomplish its objective. This approach calls for the overlying slots to have a narrow width that closely receives the connecting element except where the slots receive the connecting element when the connecting element is in its "locked" position—at which location at least one of the slots is enlarged to receive the connecting element quite loosely. When the connecting element is closely received within the narrow regions of the aligned slots, it provides a driving connection between the overlying arms. However, when the connecting element is quite loosely received at its "locked" position, the "lost motion" or "play" that is provided by the looseness with which the connecting member is received in at least one of the aligned slots permits the first arm (i.e., the arm that is connected to the paddle handle) to pivot freely (in response to pivoting of the paddle handle) without causing the connecting element to cause corresponding movement of the second arm (i.e., the arm that must be pivotally moved to effect latch operation). This first approach is utilized in the embodiment of FIGS. 1–13 hereof, but can be substituted for the approach that is utilized in the embodiment of FIGS. 14–38.

2) The other approach contemplated by the invention relies more on slot orientation and positioning than on slot configuration. Indeed, with this approach, the slots can both exhibit substantially uniform widths along their entire lengths. This approach calls for the slot that is formed in tile first arm (i.e., the arm that pivots in response to pivotal movement of the paddle handle) to have a "disconnect location" along its length–a region of the slot that is oriented to extend substantially perpendicular to an imaginary line that extends from the "disconnect location" to intersect the common axis about which both of the arms pivot. When the connecting element is "locked" (meaning that it is positioned at the "disconnect location" of the first slot), pivotal movement of the first arm (in response to pivotal movement of the paddle handle) will cause opposite sidewalls of the first slot (i.e., the slot formed in the first arm) to slide freely past opposite sides of the connecting element without exerting enough in the way of driving force on the connecting element to cause it to pivot the second arm. Stated in another way, the connecting element, when in its "locked" position, is at a "disconnect location" along the length of the first slot where pivotal movement of tile first arm moves opposite sidewalls of the first slot substantially tangentially to a radius that extends from the common axis to the disconnect location—hence pivotal movement of the first arm simply causes portions of the first slot to slide smoothly past the connecting element without drivingly engaging the connecting element to cause unlatching movement of the second arm. This second approach is utilized in the embodiment of FIGS. 14–38 hereof, but can be substituted for the approach that is utilized in the embodiment of FIGS. 1–13.

These approaches have in common the fact that they rely on the positioning of a connecting element along aligned slots in overlying arms pivoted about a common axis, and that they rely on slot configuration and/or orientation to cooperate with the connecting element so that a driving connection will be established between the arms except when the connecting element is moved to its locked position through operation of a lock cylinder. The resulting provision of a "linkage disconnect" type of locking action leaves the paddle handle "free wheeling" (i.e., free to move between its non-operated and operated positions) when the operating assembly is "locked," whereby the operating assembly is far less likely to suffer damage or defeat due to "forcing" of the operating handle.

In preferred practice, a paddle handle operating assembly that employs the "linkage disconnect" locking system of the present invention has a flush-mountable lousing that pivotally mounts its paddle handle in a forwardly-facing recess defined by the housing. A key or combination operated lock cylinder or the like is carried by the housing to provide a locking member located behind the housing that is movable between locked and unlocked positions; and, the locking member is coupled to the connecting element of the operating linkage for controlling the position of the connecting element within the aligned slots that are defined by overlying arms of the operating linkage that pivot about a common axis. When the lock cylinder positions the locking member in its locked position, the locking member positions the connecting element to establish no driving connection between the arms that causes the arms to move in unison. When the lock cylinder positions the locking member in its unlocked position, the lock member positions the connecting element in relatively narrow regions of the aligned slots where the connecting element establishes a driving connection for pivoting the arms in unison to operate the latch assemblies when the paddle handle is moved from its non-operated position to its operated position.

Where the "enlarged slot end region" approach is utilized, the aligned slots preferably are oriented such that one of their aligned end regions is located closer to the common pivot axis of the arms than is the other of their aligned end regions. In preferred practice, it is the inner of these end regions (i.e., the one located more closely to the common pivot axis) where at least one of the slots is enlarged to receive the connecting element relatively loosely therein when the lock cylinder positions the locking member in the locked position to disable the driving connection provided between the arms by the connecting element; and, it is the narrower outer end region (the opposite end region of the aligned slots which is located farther from tile common pivot axis where both of the slots are relatively narrow) where the connecting element is positioned by the lock cylinder when the locking member is in its unlocked position. If the inner end region is located measurably closer to tile common pivot axis than the outer end region, it is desirable to select the inner end region as tile location for the needed slot enlargement, for less of an enlargement is needed here than would be required if tile outer end region is selected (inasmuch as the arc through which the arm moves that is pivoted by the paddle handle is shorter the closer it is located to the common pivot axis).

A feature of preferred practice resides in the use of a pin-type of connecting element, with the pin being carried by a simple locking link that is pivotally connected to the locking member of the lock cylinder.

This use of a simple link-carried pin as a connecting element that extends into aligned slots of a pair of pivoted linkage arms permits a "linkage disconnect" type of locking action to be provided in a paddle handle operating assembly at relatively low cost utilizing simple, easy-to-assemble components that offer reliable service and a lengthy service life.

The first of the two operating assembly embodiments that are depicted in the drawings hereof (namely in FIGS. 1–13) illustrates how features of the invention preferably are implemented in a relatively simple unit that includes a single rotary latch connected directly to the housing of the operating assembly. The resulting unit provides a slam-capable, flush-mountable, paddle-handle-operated, single-jaw rotary latch having a jaw-retaining rotary pawl that can be pivoted to "unlatch" the rotary latch by an operating linkage that includes a pair of overlying arms that are connected directly to the housing for pivotal movement along a back wall of the housing for executing an "unlatching" movement in response to movement of the paddle-type handle from its normal, non-operated position to its operated position.

The second of the two operating assembly embodiments depicted in the drawings hereof (namely in FIGS. 14–38) illustrates how features of the invention preferably are implemented in a more complex, modular-type of operating assembly that is set up to operate a pair of remotely located latch assemblies. The operating assembly has its components divided between a set of "front" and "rear" assemblies or "modules" that cooperate advantageously to do such things as reinforce each other and to aid in the mounting of the operating assembly on a closure. While this modular operating assembly is relatively complex, the manner in which a disconnect is provided has much in common with the approach that is utilized by the simpler operating assembly, namely by using a pair of overlying arms that pivot about a common axis and that are drivingly connected or disconnected by a connecting element that is carried in aligned slots formed through the overlying arms, with the position of the connecting element within the slots being controlled by a lock cylinder to selectively establish and disable a driving connection between the overlying arms. In the more complex embodiment (of FIGS. 14–38), the overlying arms are not connected directly to the flush-mountable housing of the operating assembly, but rather are pivotally mounted on a mounting bracket that is connected to the housing when the operating assembly is installed on a closure.

BRIEF DESCRIPTION OF THE DRAWINGS

These and other features, and a fuller understanding of the invention may be had by referring to the following description and claims, taken in conjunction with the accompanying drawings, wherein:

DESCRIPTION OF THE PREFERRED EMBODIMENT

Figure 1:
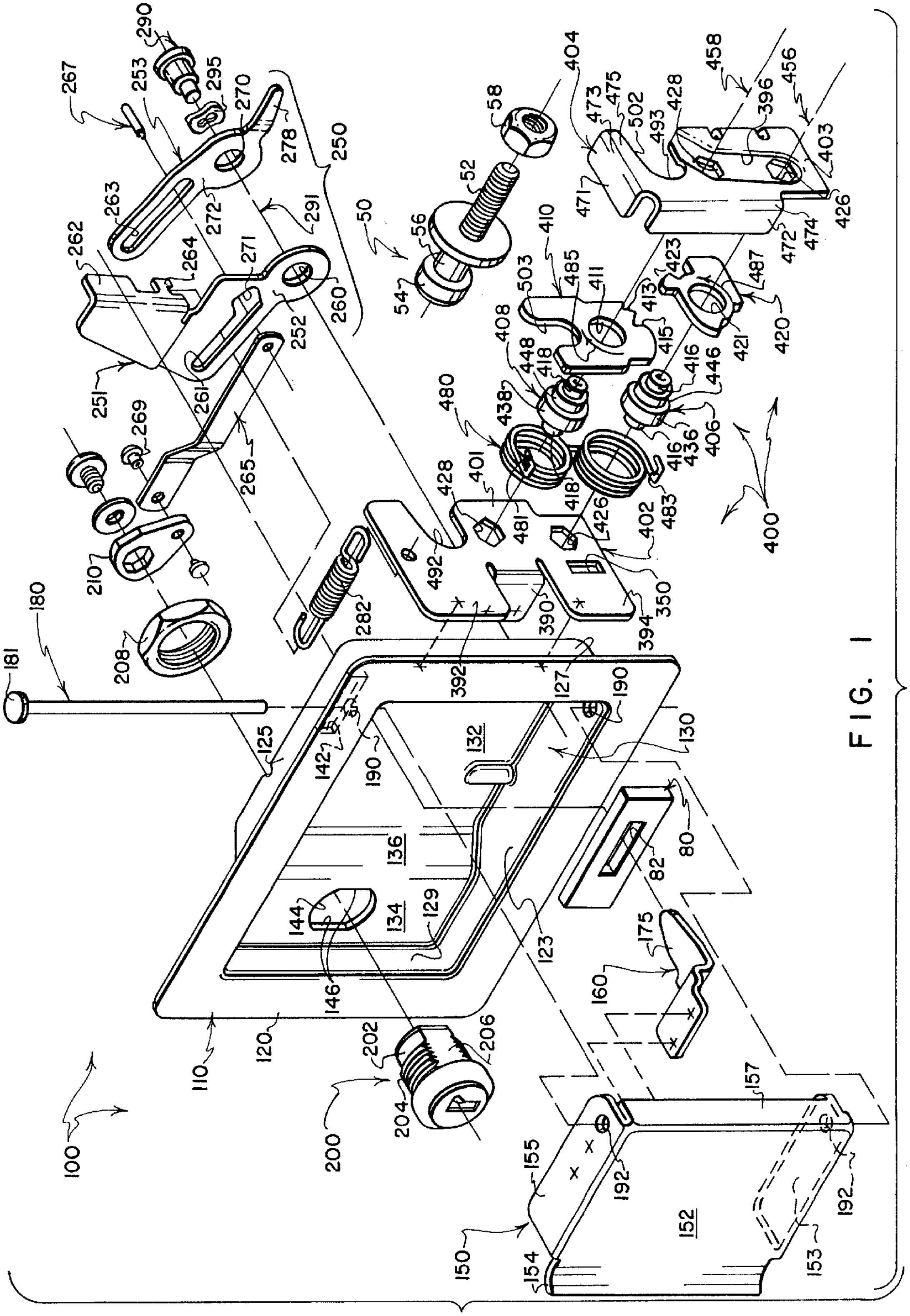
FIG. 1 is an exploded front perspective view of components of a first embodiment of a combined paddle handle operator and rotary latch unit that incorporates features of the preferred practice of the present invention, with a typical strike that can be engaged by the rotary latch assembly of the unit also being shown.
Figure 2:
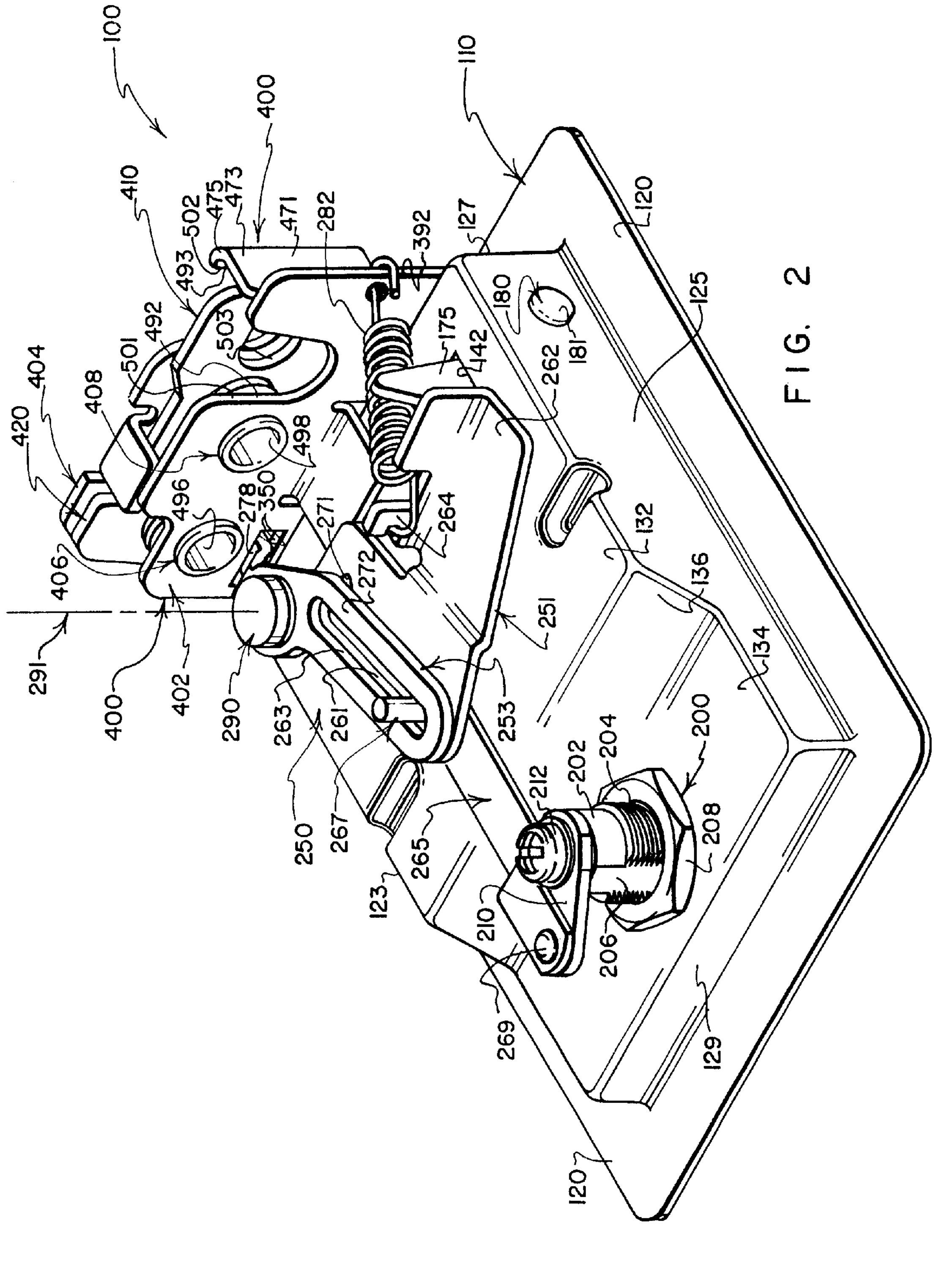
FIG. 2 is a rear perspective view, on an enlarged scale, showing the unit with its components assembled, with its rotary jaw in a latched position, with its overlying operating arms in a primary position, and with the connecting element that is positioned by the lock cylinder of the unit being "unlocked" so as to establish a driving connection between the overlying operating arms—an arrangement that necessitates that the paddle handle of the unit be in its normal, non-operated position.

Referring to FIGS. 1–10, one form of combined paddle handle operator and rotary latch unit that embodies features of the preferred practice of the present invention is indicated generally by the numeral 100. Referring to FIGS. 1 and 2, the unit 100 has a pan-shaped housing 110 on which are mounted a paddle-type operating handle 150, a key-operated lock cylinder 200, an operating linkage 250, and a rotary latch assembly 400.

Before turning to a more detailed description of the components of the unit 100, a brief overview of the unit's "linkage disconnect" locking system is provided. The operating linkage 250 includes overlying first and second arms 251, 253, and a pin-type connecting element 267 which is carried by a locking link 265 connected to the lock cylinder 200. The overlying first and second arms 251, 253 are mounted on the housing 110 for independent pivotal movement about a common pivot axis 291 by a headed shoulder pin 290.

First and second slots 261, 263 are defined by the first and second arms 251, 253, respectively. The arms 251, 253 are oriented so that the slots 261, 263 are aligned. Except for an enlarged inner end region 271 (see FIGS. 1 and 6) of the slot 261, the slots 261, 263 are of uniform, relatively narrow width along their lengths—a width that is selected to closely but slidingly receive the pin-type connecting element 267.

A driving connection is selectively provided and disconnected between the overlying arms 251, 253 depending on where the pin-type connecting element 267 is positioned along the lengths of the aligned slots 261, 263, in that:

1) When the unit 100 is "unlocked" (meaning that the lock cylinder 200 has moved the locking link 265 to position the pin-type connecting element 267 in relative narrow portions of both of the slots 261, 263), the fact that the connecting element 267 is closely received by both of the overlying slots 261, 263 will cause the arms 251, 253 to pivot in unison about the axis 291 when tile paddle-type handle 150 is moved from its non-operated position (see FIGS. 5 and 9) to its operated position (see FIGS. 6 and 10); and, this pivoting in unison of the overlying arms 251, 253 will cause the latch assembly 400 to be operated (i.e., to "unlatch) to release its engagement with a suitably configured strike, such as the strike 50 that is depicted in FIG. 1; however, 2) When the unit 100 is "locked" (meaning that the lock cylinder 200 has moved the locking link 265 to position the pin-type connecting element 267 within the enlarged inner end region 271 of the slot 261), the enlarged inner end region 271 so loosely receives the pin-type connecting element 267 that, when the first arm 251 is pivoted due to movement of the paddle handle 150 from its non-operated position (see FIGS. 5 and 9) to its operated position (see FIGS. 6 and 10), either: a) the connecting element 267 is not engaged by portions of the first arm 251 that define opposite sides of the enlarged inner end region 271, hence, neither the pin-type connecting element 267 nor tile second arm 253 are caused to be moved at all; or, b) the extent of any movement that is imparted to the connecting element 267 and the second arm 253 is sufficiently insignificant as to fail to cause tile latch assembly 400 to be operated (i.e., to "unlatch").

Turning now to a more detailed description of the components of the unit 100, and referring principally to FIG. 1, the strike 50 has threads on one end 52, an enlarged head 54 on the other end, and defines along its length a generally cylindrical formation 56—which is what is engaged by the rotary latch assembly 400. A locknut 58 is provided for engaging the threads 52 to mount the strike 50 on a door frame or other structure (not shown) that will be positioned adjacent the unit 100 when a closure (not shown) on which the unit 100 is mounted is in its closed position.

The pan-shaped housing 110 is a generally rectangular metal stamping having a perimetrically extending, substantially flat mounting flange 120 which surrounds a forwardly facing recess 130. Opposed, relatively long side walls 123, 125, and opposed, relatively short end walls 127, 129 are joined by smooth bends to the mounting flange 120.

A majority of the recess 130 is relatively deep, and is closed by a main back wall portion 132 that is substantially flat. One end region of the recess 130 is more shallow, and is closed by a minor back wall portion 134 that also is substantially flat. A slanted back wall portion 136 forms a transition between the back wall portions 132, 134, and smooth bends join these back wall portions to adjacent portions of the side and end walls 123, 125, 127, 129.

A main back wall opening 142 (see FIGS. 2–6) is formed through the main back wall portion 132. A lock cylinder mounting hole 144 (see FIG. 1) is formed through the minor back wall portion 134. The main back wall opening 142 is of generally rectangular shape, is spaced a short distance from the housing side wall 125, and extends parallel to the housing side wall 125. The lock cylinder mounting hole 144 is generally circular except for two flats 145 from end along opposite sides thereof.

Figure 5:
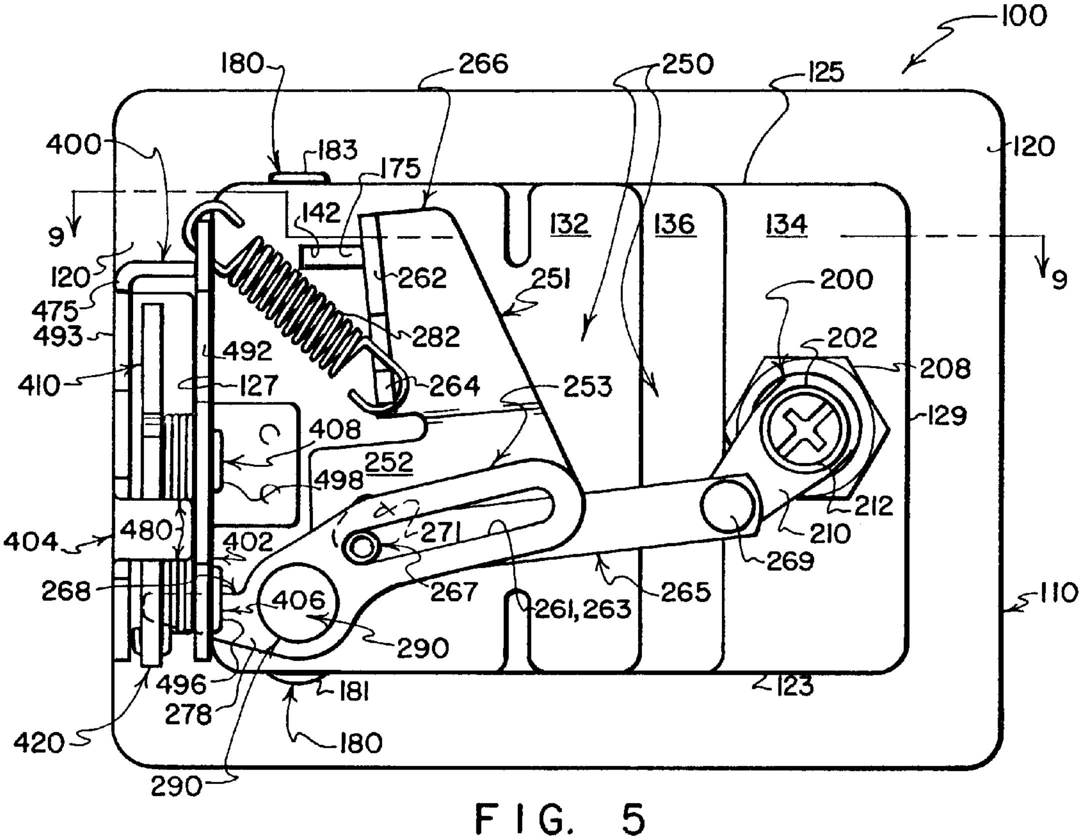
FIG. 5 is a rear elevational view similar to FIG. 3 but with the connecting element moved by the lock cylinder to a "locked" position wherein the connecting element no longer drivingly connects the overlying arms for concurrent movement.
Figure 6:
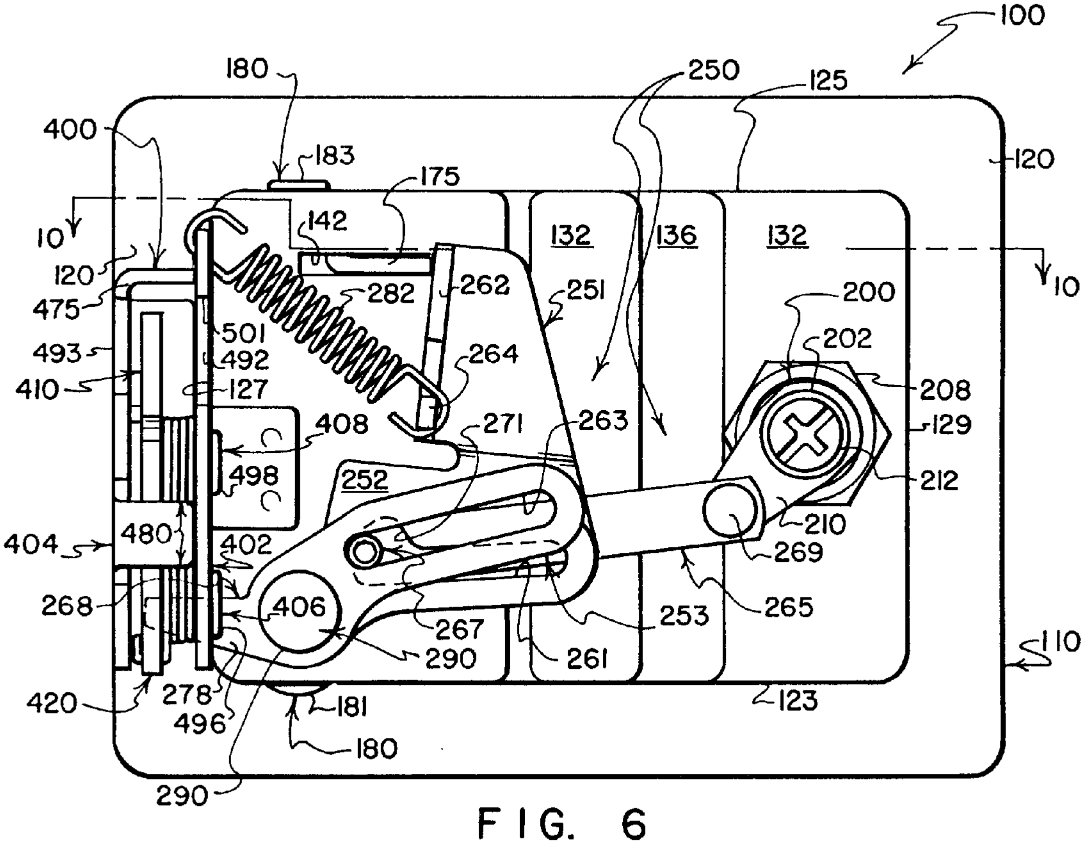
FIG. 6 is a rear elevational view similar to FIG. 5 wherein the connecting element again is "locked," but with the paddle handle moved to its operated position to thereby cause only one of the overlying arms to be pivoted to its secondary position, but with the other of the overlying arms remaining in its primary position inasmuch as there is no driving connection established between the overlying arms by the connecting element.

Referring to FIGS. 1, 5 and 6, the paddle-type operating handle 150 has a generally rectangular front wall 152 with a forwardly-turned lip 154 formed along one end, and a rearwardly-turned flange 157 at the other end. Substantially identical, rearwardly-turned side flanges 153, 155 border opposite sides of the rectangular front wall 152 and extend alongside the housing side walls 123, 125, respectively. A trigger 160 is welded to the handle side flange 153 to define a rearwardly extending handle projection 175 that extends through the main back wall opening 142.

Figure 3:
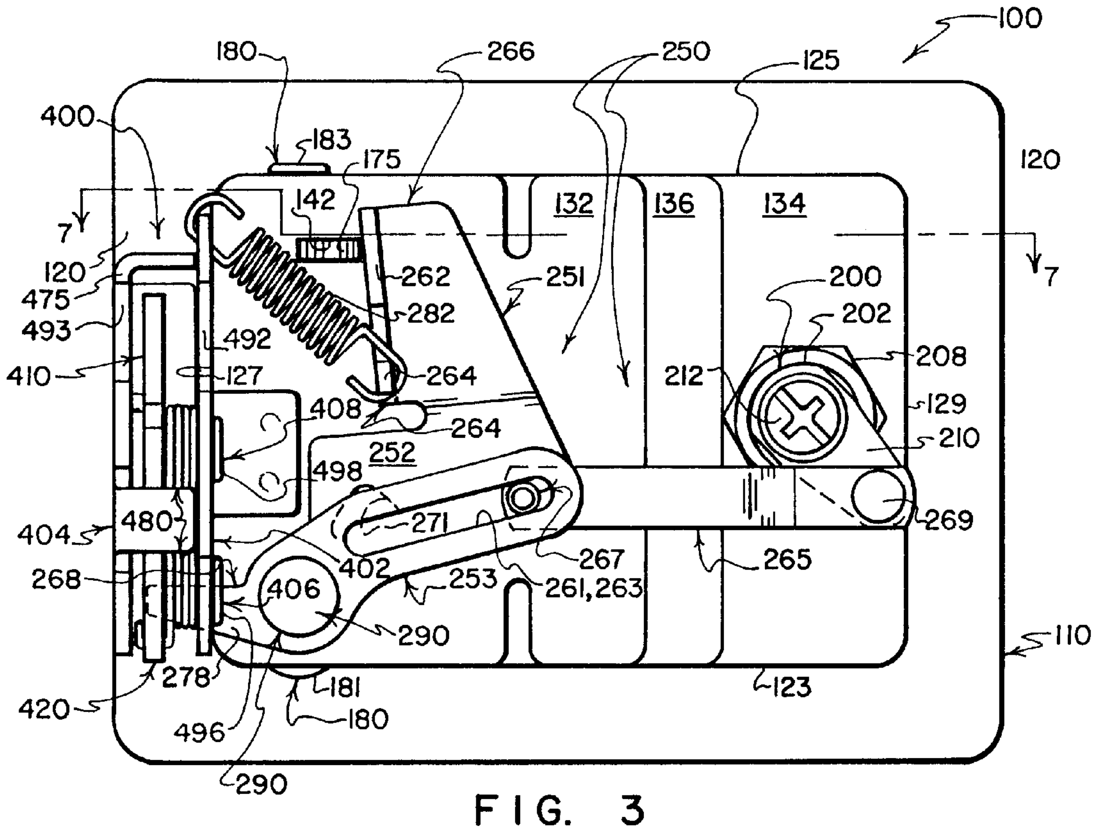
FIG. 3 is a rear elevational view thereof.

Referring to FIG. 1, a hinge pin 180 extends through aligned holes 190 that are formed through the side walls 123, 125 of the pan-shaped housing 120, and through aligned holes 192 that are formed through the rearwardly-turned side flanges 153, 155 of the paddle-type operating handle 150 to pivotally mount the handle 150 on the housing 110. Referring to FIG. 3, a head 181 is formed on one end of the pin 180. The pin 180 is secured in place in any of a variety of appropriate ways, for example by crimping or otherwise deforming the end of the pin 180 opposite the head 181 to provide a suitable enlargement 183.

When the operating handle 150 is pivoted about the axis of the pin 180 away from its normal, nested, "non-operated" position (depicted in FIGS. 7 and 9) toward its extended, operated position (depicted in FIGURES 8 and 10), the rearwardly extending handle projection 175 is caused to move within the back wall opening 142 from a normal or "first" position that is depicted in FIGS. 3, 5, 7 and 9 to a "second" position that is depicted in FIGS. 4, 6, 8 and 10. This movement of the handle projection 175 within the confines of the back wall opening 142 causes at least the first arm 251 of the operating linkage 250 to pivot about the axis 291 from a "primary" position shown in FIGS. 2, 3, 5, 7 and 9 to a "secondary" position shown in FIGS. 4, 6, 8 and 10. If the second arm 253 of the operating linkage 250 happens to be drivingly connected to the first arm 251 (due to suitable positioning of the pin-type connecting element 267 within the aligned slots 261, 263) when the paddle handle 150 is pivoted in this manner, the second arm 253 will be caused to pivot in unison with the first arm 251 about the axis 291 to "unlatch" the rotary latch assembly 400 from latchingly engaging the strike 50 (see FIGS. 11–13).

Figure 7:
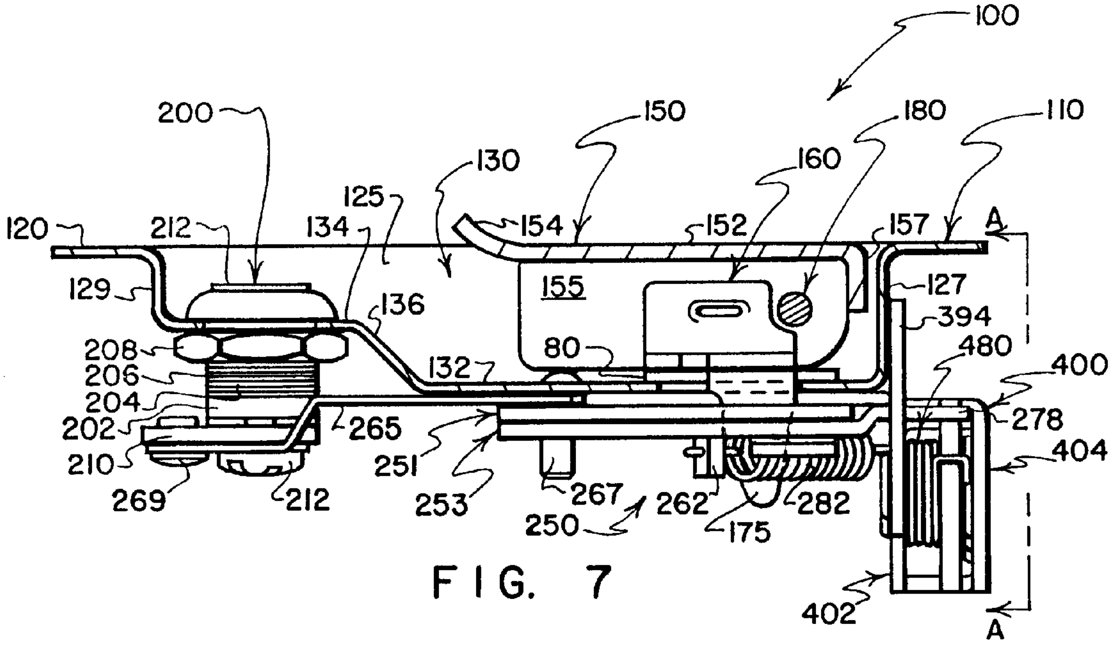
FIG. 7 is a sectional view as seen from planes indicated by a broken line 7—7 in FIG. 3.
Figure 8:
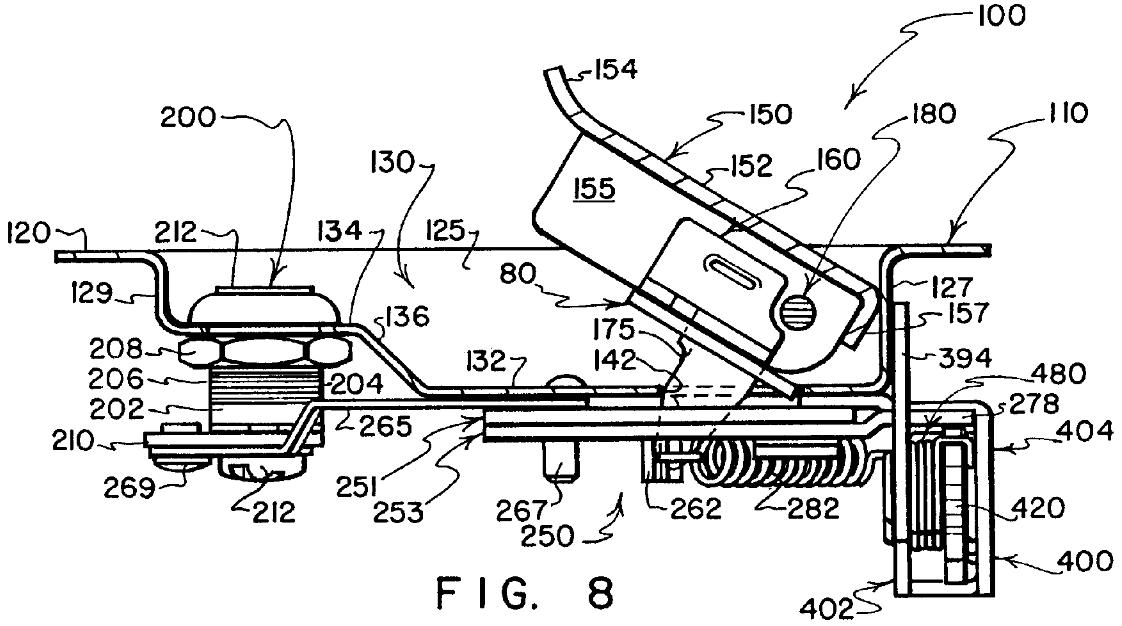
FIG. 8 is a sectional view as seen from planes indicated by a broken line 8—8 in FIG. 4.
Figure 9:
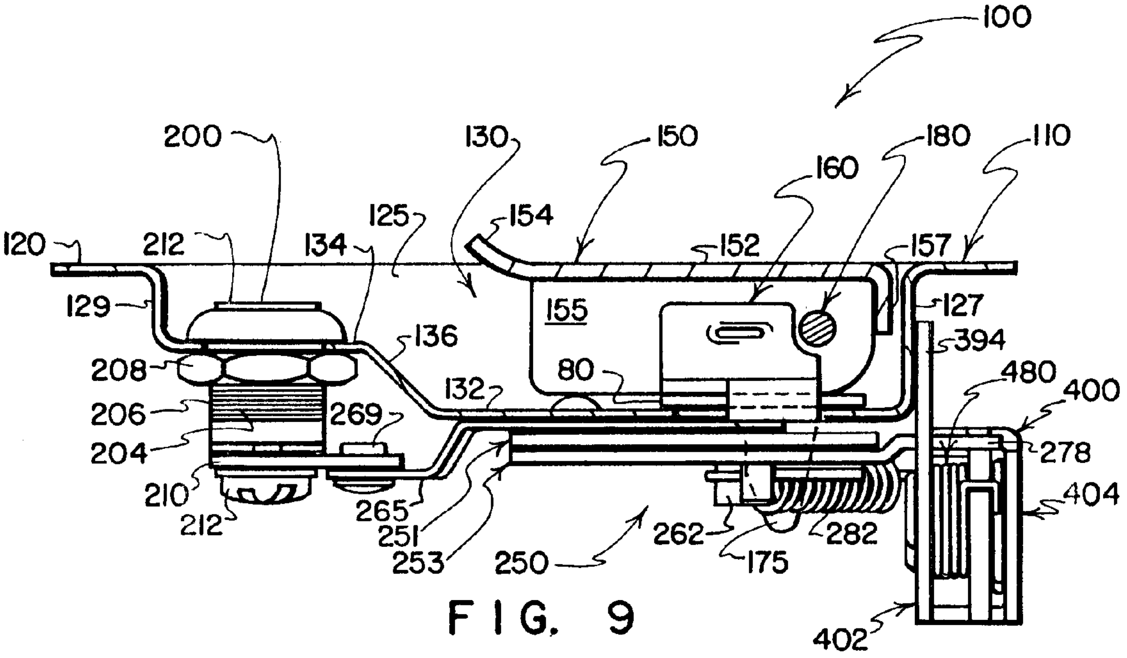
FIG. 9 is a sectional view as seen from planes indicated by a broken line 9—9 in FIG. 5.
Figure 10:
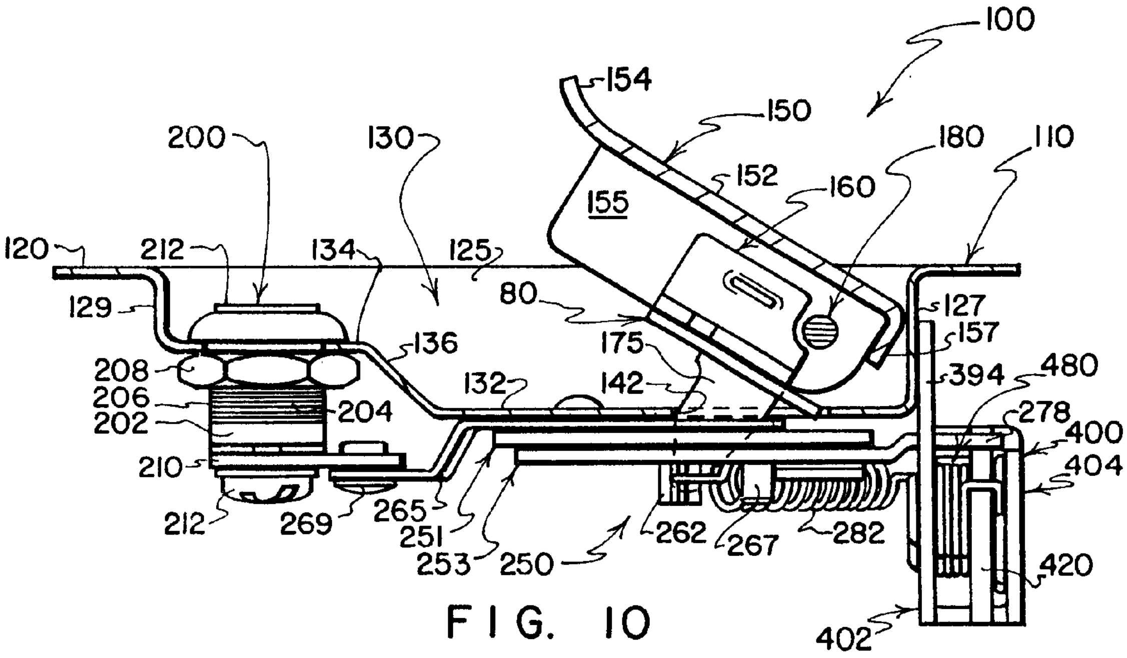
FIG. 10 is a sectional view as seen from planes indicated by a broken line 10—10 in FIG. 6.

Referring to FIGS. 1 and 7–10, to prevent the passage of unwanted moisture, debris and the like through the main back wall opening 142, a generally rectangular gasket 80 may be provided. The gasket 80 has a central opening 82 through which the handle projection 175 extends. As will be seen by comparing the position of the gasket 80 as depicted in FIGS. 5, 7 and 9 with the position of the gasket 80 shown in FIGS. 8 and 10, the gasket 80 preferably is connected to the trigger 160 to move therewith when the handle 150 pivots about the axis of the pin 180.

Referring to FIGS. 1–10, the key-operated lock cylinder 200 is a commercially purchased item that has a generally tubular body 202 that carries threads 204, with opposite side portions 206 of the body 202 being flat. The tubular housing 202 is received in the lock cylinder mounting hole 144, with the flats 206 engaging the flats 146 to prevent the body 202 from rotating relative to the housing 110. A nut 208 is tightened on the threads 204 to mount the body 202 on the housing 110. Carried within the tubular body 202 is a key-operated rotatable plug 212 that carries a cam 210 at a location spaced rearwardly from the tubular housing 202. The cam 210 is movable between a "locked" position, as depicted in FIGS. 5, 6, 9 and 10, and an "unlocked" position, as depicted in FIGS. 2–4, 7 and 8.

Referring to FIGS. 1 and 2, the first arm 251 preferably is formed as a metal stamping that has a main region 252 which defines a mounting hole 260 that journals the pin 290, and an L-shaped connection region 262 that is engaged by the handle projection 175. The engagement of the L-shaped connection region 262 by the handle projection 175 is what establishes a driving connection between the paddle handle 150 and the first arm 251. This driving connection causes the first arm 251 to pivot from its primary position (see FIGS. 2 and 3) to its secondary position (see FIG. 4) in response to pivotal movement of the paddle handle 150 from its non-operated position (see FIG. 7) to its operated position (see FIG. 8).

The L-shaped connection region 262 defines a small projecting formation 264. A tension coil spring 282 connects with the formation 264 and with a side plate 402 of the latch assembly 400 to bias the first arm 251 away from its secondary position (see FIG. 4) toward its primary position (see FIGS. 2 and 3). The biasing action of the spring 282 also functions to maintain engagement between the L-shaped connection region 262 and the handle projection 175; and, in turn, the bias the paddle handle 150 away from its operated position toward its normal non-operated position.

Referring to FIGS. 1 and 2, the second arm 253 preferably is formed as a metal stamping that has a main region 272 which defines a mounting hole 270 that journals the pin 290, and a pawl formation 278 for transferring "unlatching" movement of the second arm 253 to the rotary latch assembly 400. The pawl-engaging formation 278 extends through a slot 350 formed in a housing side plate 402 of the rotary latch assembly 400. A spring washer 295 (see FIG. 1) carried on the shoulder pin 290 engages the second arm 253 and biases the first and second arms 251, 253 together to minimize play and to overcome the tendency these components might otherwise have to vibrate or rattle.

Referring to FIG. 1, the latch assembly 400 has what will be referred to as a "housing" that consists of first and second "housing side plates" 402, 404 that are held together by two identical spacers or bushings 406, 408 that extend along transverse axes 456, 458.

The housing side plate 402 is substantially flat except for a central mounting tab 390 that extends substantially perpendicular to the plane of other portions of the housing side plate 402 at a location spaced between two other mounting tabs 392, 394. The tabs 392, 394 are welded to the end wall 127 of the pan-shaped housing 110. The tab 390 is welded to the main back wall portion 132.

The housing side plate 404 is substantially flat except 1) for an elongate recess 396 stamped therein, 2) for a pair of transversely extending flanges 471, 472 that are joined by small radius bends 473, 474, respectively, to the main flat portion 403 of the side plate 404.

The bushings or spacers 406, 408 are tubular (i.e., they have hollow interiors), and have reduced diameter end regions 416, 418 that are sized to be received in a slip fit within hex-shaped holes 426, 428 (FIG. 1) that are formed in the flat central portions 401, 403 of the side plates 402, 404, respectively. To securely retain the hollow, reduced diameter end regions 416, 418 in the hex-shaped holes 426, 428 (to thereby rigidly interconnect the housing side plates 402, 404), the end regions 416, 418 are deformed and enlarged to form heads 496, 498 (see FIG. 2) that have hollow interiors. The end regions 416, 418 tend to be of slightly hex shape after the end regions 416, 418 have been properly deformed to fully engage the sides of the hex-shaped holes 426, 428. Because the holes 426, 428 are hex-shaped, and because the hollow end regions 416, 418 are expanded during formation of the heads 496, 498 to fully fill the hex-shaped holes 426, 428, good, secure, rotation-resistant connections are formed that rigidly interconnect the side plates 402, 404 and that resist loosening and rotation of the bushings 406, 408 relative to the side plates 402, 404.

Referring still to FIG. 1, the bushings 406, 408 are generally cylindrical, and provide stepped central regions that have relatively large diameter portions 436, 438 and relatively medium diameter portions 446, 448, respectively. The end and central regions 416, 436, 446 of the bushing 406 are concentric about the transversely extending axis 456. The end and central regions 418, 438, 448 of the bushing 408 are concentric about the transversely extending axis 458.

Figure 11:
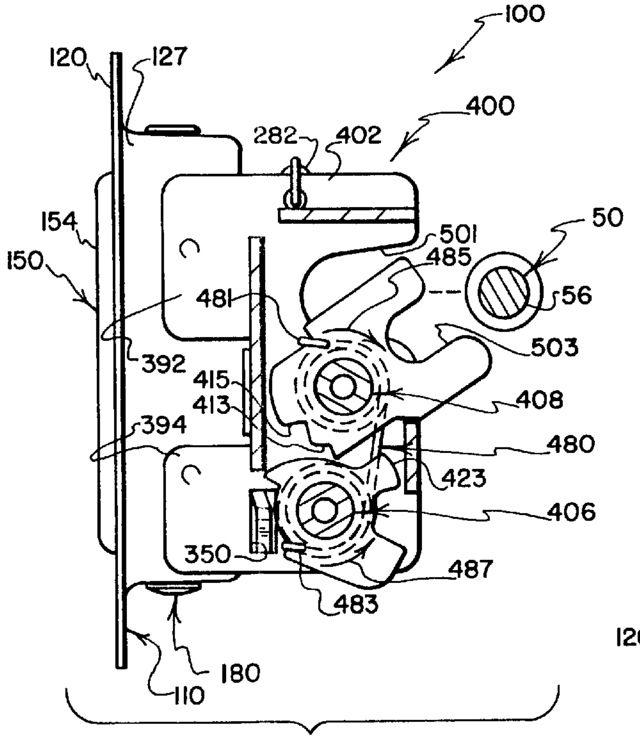
FIGS. 11, 12 and 13 are sectional views as seen generally from a plane indicated by a line A—A in FIG. 7, and are provided to schematically depict a sequence of three steps by which a suitably configured strike comes to be received in and latchingly retained by rotary latch assembly, with FIG. 11 showing the latch assembly "unlatched" and the strike not yet engaging the latch assembly, with FIG. 12 showing the strike being received by the latch assembly and showing a preliminary latching orientation of latch components, and with FIG. 13 showing a fully latched configuration of the strike and latch assembly.
Figure 12:
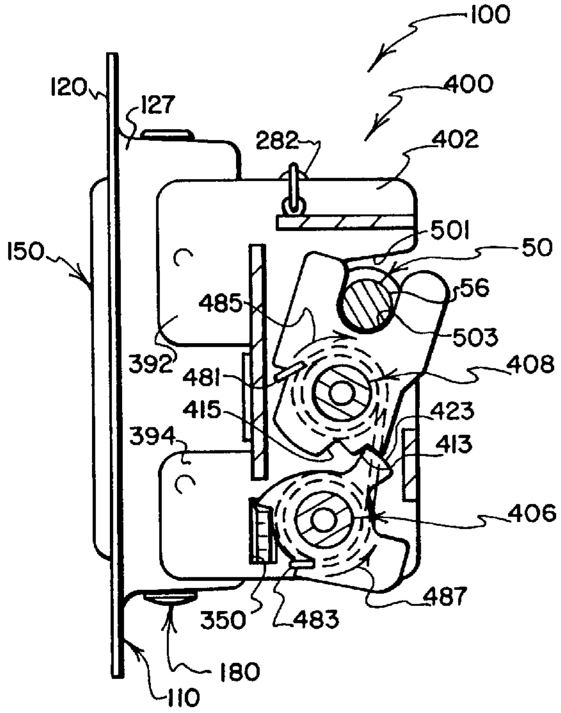
Figure 13:
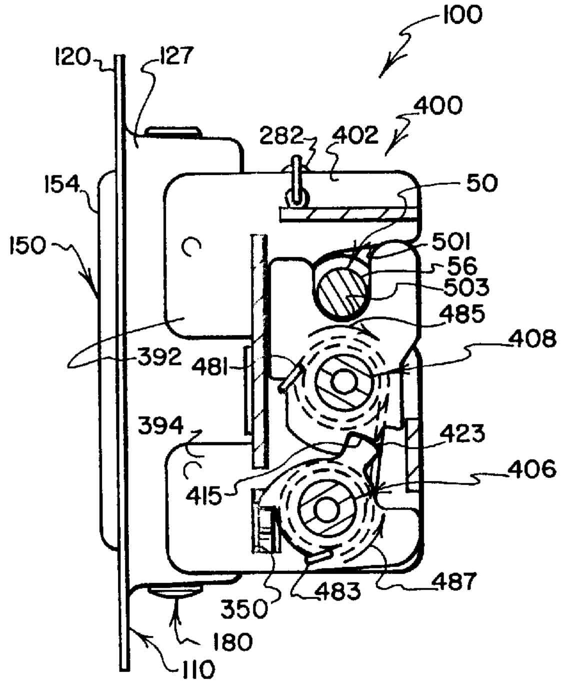

Referring to FIGS. 1 and 2, the side plates 402, 404 define aligned first and second U-shaped notches 501, 502, respectively, that open rearwardly with respect to a closure (not shown) on which the unit 100 is mounted so that, as the closure is moved toward its closed position, the resulting rearward movement of the side plates 402, 404 by the closure will cause the central region 56 of the strike 50 to be received within the first and second U-shaped notches 501, 502 (see FIGS. 11–13). Referring to FIGS. 1, 2 and 13, a cooperating third U-shaped notch 503 is formed in the rotary jaw 410, and functions in concert with the first and second U-shaped notches 501, 502 to receive and latchingly retain the central region 56 of the strike 50 therein when the closure that mounts the unit 100 is closed.

In preferred practice, the second U-shaped notch 502 (either alone or in concert with the first U-shaped notch 501) defines a strike engagement surface (or surfaces) that is (are) directly engageable by the central region 56 of the strike 50. If the first and second U-shaped notches 501, 502 are identically configured and positioned to extend in congruent alignment, a pair of congruently aligned strike engagement surfaces 492, 493 (see FIG. 1) are defined by the notches 501, 502—which are engageable by the central region 56 of the strike 50 as the central region 56 moves into and is latchingly retained within the U-shaped notches 501, 502. If, on the other hand, the first U-shaped notch 501 is configured such that it is wider than the second U-shaped notch 502 (so that the surfaces that define the first notch 501 are positioned such that they cannot physically engage the strike 50), the only strike engagement surface that will be defined by either of the notches 501, 502 is the strike engagement surface 493 that is defined by the second U-shaped notch 502.

By always ensuring that the strike engagement surface 493 is defined by the second U-shaped notch 502 (regardless of whether an additional strike engagement surface 492 is defined by the first U-shaped notch 501), advantage will always be taken of the close proximity presence to the second notch 502 (and to the strike engagement surface 493) of a transversely extending reinforcing flange 471 that is formed integrally with the second side plate 404 near one end thereof. A tight radius bend 473 connects the flange to a narrow portion 475 (see FIGS. 1 and 2) of the second side plate 404 that extends along one side of the second notch 502 (and that defines the strike engagement surface 493). The close proximity presence of the transversely extending flange 471 and the bend 473 to the second notch 502 (and to the strike engaging surface 493 that is defined by the second notch 502) strengthens and rigidities the second housing side plate 404 in the critical area adjacent the strike engaging surface 493.

While the second U-shaped notch 502 could be configured such that it is wider than the first U-shaped notch 501 (whereby the only strike engagement surface that would be defined by either of the notches 501, 502 is the strike engagement surface 492 that is defined by the first U-shaped notch 501), this option does not conform to the preferred practice of the present invention unless the first side plate 402 is provided with a transversely extending flange (not shown) that is substantially identical to tile depicted flange 471, but which extends from the first side plate 402 toward the second side plate 404 to bridge the space therebetween (instead of extending from the second side plate 404 toward the first side plate 402 to bridge the space therebetween, as does the depicted flange 471).

Referring to FIG. 1, housed between the side plates 402, 404 are the rotary jaw 410 and the rotary pawl 420. The rotary jaw 410 has a mounting hole 411 that receives the bushing diameter 448 therein in a slip fit to mount the rotary jaw 410 on the bushing 408 for limited angular movement about the transversely extending axis 458. The rotary pawl 420 has a mounting hole 421 that receives the bushing diameter 446 therein in a slip fit to mount the rotary pawl 420 on the bushing 406 for limited angular movement about the transversely extending axis 456.

Also housed between the side plates 402, 404 is a torsion coil spring 480 that has a first coil 486 that extends about the diameter 436 of the bushing 406, and a second coil 488 that extends about the diameter 438 of the bushing 408. An end 481 of the spring 480 engages the rotary jaw 410 for biasing the rotary jaw 410 in a direction of angular movement about the axis 458 that is indicated by an arrow 485 (FIGS. 11–13). An opposite end 483 of the spring 480 engages the rotary pawl 420 for biasing the rotary pawl 420 in a direction of angular movement about the axis 456 that is indicated by an arrow 487 (FIGS. 11–13).

Referring to FIGS. 11–13, the rotary jaw 410 and the rotary pawl 420 are provided with engageable formations 413, 423, respectively, that cooperate to "preliminarily latch" the rotary jaw 410 in engagement with the central region 56 of the strike 50 after the strike 50 has moved only a short distance into the aligned first and second U-shaped notches 501, 502 during movement of the closure toward its closed position.

The rotary jaw 410 and the rotary pawl 420 also are provided with engageable formations 415, 423, respectively, that cooperate to "fully latch" the rotary jaw 410 in engagement with the central region 56 of the strike 50 after the strike 50 has moved as far as it is going to move into the aligned first and second U-shaped notches 501, 502 as the closure is moved to its fully closed position. When the engageable formations 415, 423 are engaged (as is depicted in FIG. 13), the rotary jaw 410 is prevented by the rotary pawl 420 from executing unlatching movement until the rotary pawl 420 is rotated about the axis 456 to a pawl-releasing position wherein the engageable formations 415, 423 disengage to permit the rotary jaw 410 to rotate away from its fully latched position toward its unlatched position wherein the strike 50 is free to move out of the third U-shaped notch 503 that is defined by the rotary jaw 410. This type of pawl-controlled jaw latching action is well known to those who are skilled in the art, and is further illustrated and described in the patents that are identified above.

Figure 4:
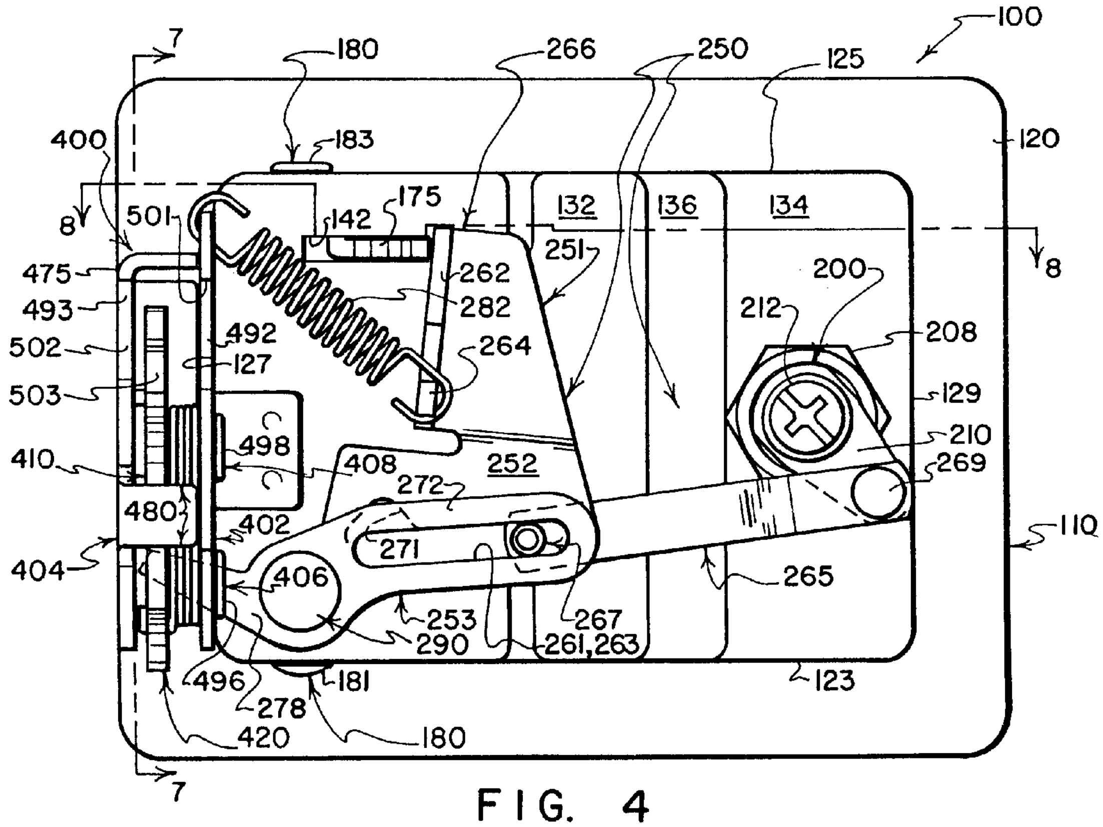
FIG. 4 is a rear elevational view similar to FIG. 3 wherein the connecting element is still "unlocked," but with the paddle handle moved to its operated position to thereby cause the overlying arms (which are drivingly connected by the connecting element) to pivot in unison to a secondary position that causes the rotary pawl of the rotary latch assembly to "unlatch" the rotary jaw, and with the rotary jaw in an unlatched position.

To move the rotary pawl 420 in opposition to the action of the torsion coil spring 480 (i.e., in a direction opposite the arrow 487) from a pawl-retaining position (depicted in FIG. 9) to a pawl-releasing position (depicted in FIG. 7), the second arm 253 of the operating linkage 250 is pivoted (about the axis 291 from the "primary" position depicted in FIG. 3 to the "secondary" position depicted in FIG. 4—which can only be done if the lock mechanism 200 has been operated to position the cam 210 in its unlocked position, as shown in FIG. 4) by operating the handle 150 (to pivot the handle 150 about the axis of the pin 180 from its normal non-operated position shown in FIGS. 1 and 5 to its operated position shown in FIG. 6). When the operated handle 150 is released, it returns to its non-operated position under the influence of the spring 282, hence the rearward extending handle projection 175 no longer remains in the "second" position of FIG. 4 where it holds the operating arm 250 in its "secondary" position (shown in FIG. 4). As the projection 175 returns to the "first" position of FIGS. 1 and 5, the operating arm 250 is caused to return to its "primary" position (shown in FIG. 3) due to the biasing action of the spring 282.

So long as the rotary jaw 410 of the latch assembly 400 is in its unlatched position (depicted in FIG. 11), the rotary jaw 410 always can be slammed into latching engagement with the strike 50. This is true regardless of how other relatively movable components of the unit 100 may be positioned. As the rotary jaw 410 receives the strike 50 within its third U-shaped notch 503, and as the strike 50 moves into the aligned first and second U-shaped notches 501, 502 of the housing side plates 402, 404, the strike 50 becomes cooperatively confined by the combined action of the first, second and third notches 501, 502, 503. When the strike 50 reaches the position that is depicted in FIG. 12, the rotary pawl 420 and the rotary jaw 410 become "preliminarily latched" (i.e., the engagement formations 413, 423 engage to prevent unlocking of the rotary jaw 410). When the strike 50 reaches the fully latched position depicted in FIG. 13, the engagement formations 415, 423 engage to fully lock the closure in its closed position.

So long as the key-locking assembly 200 positions the cam 210 in its "unlocked" position, as is depicted in FIGS. 3 and 4, the arms 251, 253 will be drivingly connected by the connecting element 267—hence, the operating handle 150 can be pivoted out of its nested, non-operated position (shown in FIGS. 3 and 7) to its extended, operated position (shown in FIGS. 4 and 8) to cause the projecting formation 175 to pivot the arms 251, 253 to pivot the rotary pawl 420 away from its normal jaw-retaining position (shown in FIG. 13) toward its jaw-releasing position (shown in FIG. 11) to release the pawl formation 423 from engaging either of the jaw formations 413, 415, whereupon the rotary jaw 410 pivots under the influence of the spring 480 away from its latched position (shown in FIG. 13) to its unlatched position (shown in FIG. 11) to release the strike 50.

While the "linkage disconnect" locking system used in the operating assembly embodiment 100 employs an enlarged end region 271 at the inner end region of only the slot 261, those who are skilled in the art will recognize that, alternatively, an enlarged end region (not shown) could have been provided, instead, at the inner end of the other slot 263, or, alternatively, that a combination of slightly enlarged inner end regions (not shown) could have been provided at the inner end regions of both of the slots 261, 263—to receive the pin-type connecting element 267 sufficiently loosely to ensure that, when the pin-type connecting element 267 is positioned in the inner end regions of the aligned slots 261, 263 of the overlying arms 251, 253, it will not serve to transmit pivotal motion from the first arm 251 to the second arm 253 (i.e., so that the driving connection between the arms 251, 253 will be disabled or "disconnected"). An advantage that obtains from using a single enlarged end region 271 located at the inner end of only the first slot 261 is that, when the first arm 251 pivots (at a time when the connecting element 267 is positioned in the enlarged end region 271), this pivoting action will cause no movement, or only very minimal movement, of the connecting element 267; hence, the locking link 265 will not move (or its movement will be minimal), and this will minimize resulting wear by holding to a minimum the number of components that are caused to move when the paddle handle 150 is pivoted at a time when the lock cylinder 200 is "locked."

Figure 14:
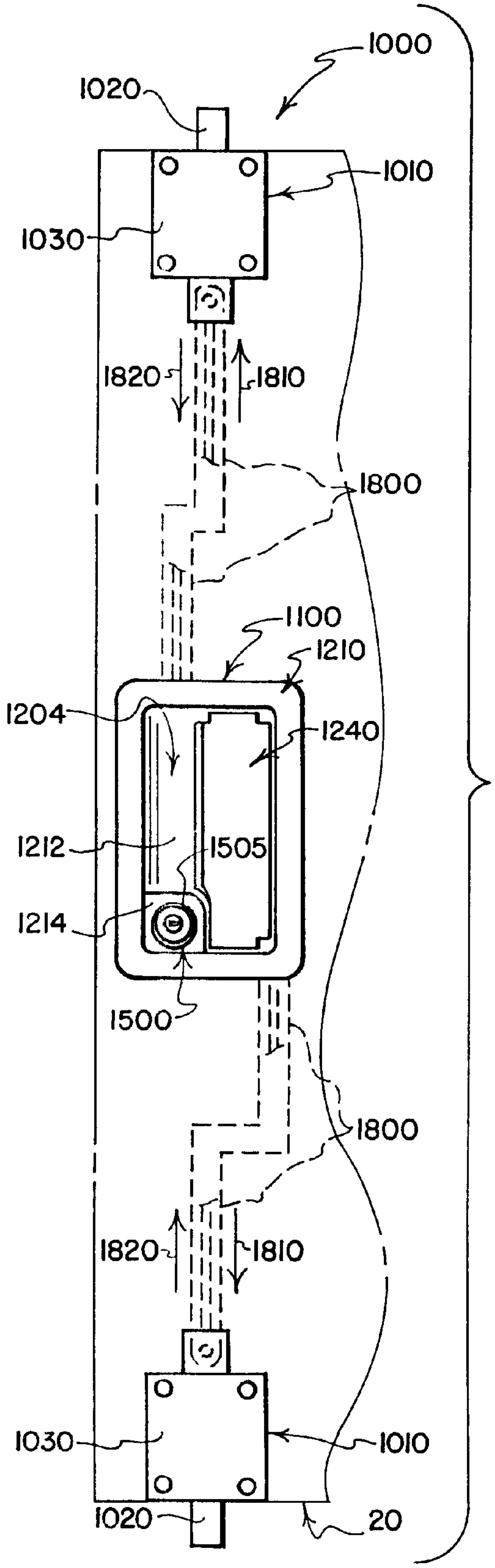
FIG. 14 is front side elevational view of a second embodiment of a paddle handle operating assembly that incorporates features of the present invention, which is connected to a pair of remotely located latch assemblies of the spring-projected-bolt type, with portions of two elongate links that interconnect the operating assembly and the latch assemblies being foreshortened, and with portions of a door on which the operating assembly is mounted being outlined in phantom.
Figure 15:
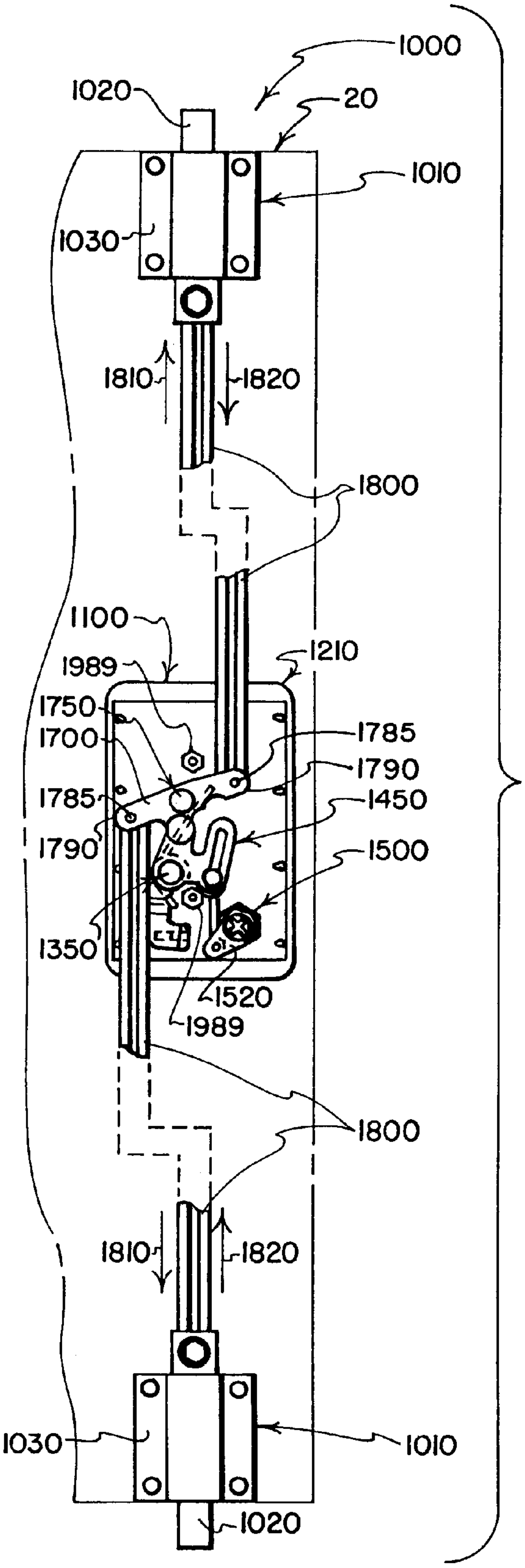
FIG. 15 is a rear side elevational view thereof.
Figure 16:
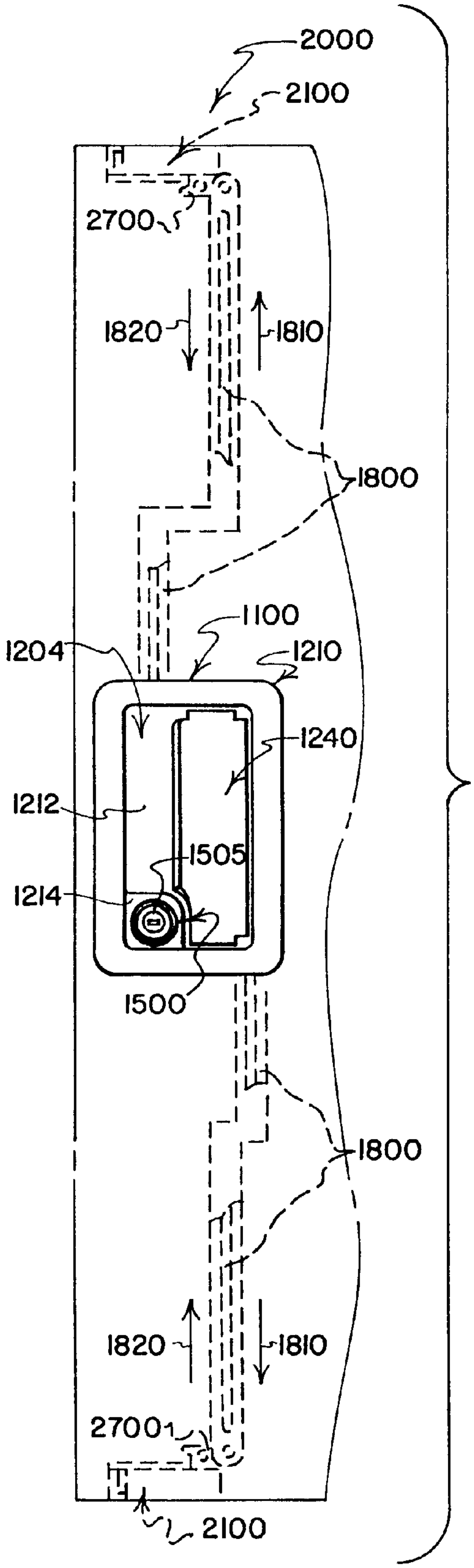
FIG. 16 is a front side elevational showing the paddle handle operating assembly of FIG. 14 connected by two elongate links to a pair of remotely located latch assemblies of the rotary bolt type, with portions of two elongate links that interconnect the operating assembly and the latch assemblies being foreshortened, and with portions of a door on which the operating assembly is mounted being outlined in phantom.
Figure 17:
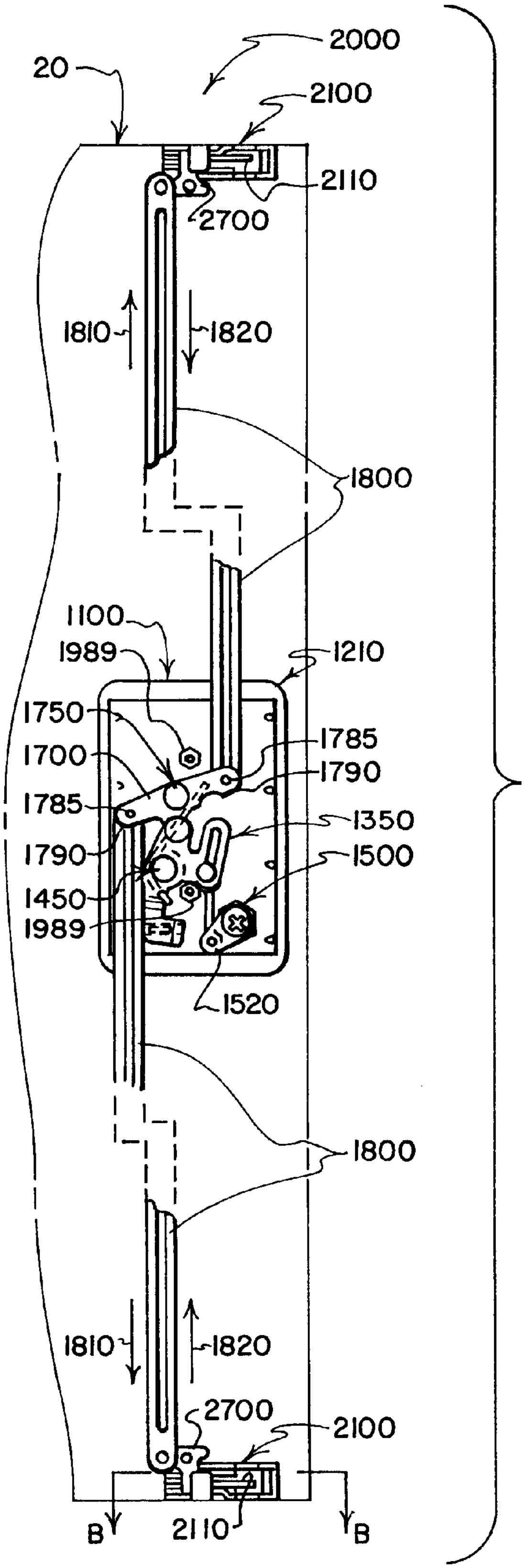
FIG. 17 is a rear side elevational view thereof.

Referring to FIGS. 14–17, a second form of paddle handle operating assembly that embodies features of the preferred practice of the present invention is indicated generally by the numeral 1100. In FIGS. 14 and 15, the operating assembly or "unit" 1100 operates a "two point" door locking system 1000 of the type that utilizes two identical latch assemblies 1010 of the spring-projected bolt type that are connected to the unit 1100 by elongate links 1800. In FIGS. 16 and 17, the operating assembly or "unit" 1100 operates a "two point" door locking system 2000 that utilizes two substantially identical rotary latch assemblies 2100 that are connected to the unit 1100 by the elongate links 1800. While the spring-projected bolt latches 1010 are "identical" one with another, the rotary latch assemblies 2100 are "substantially identical" in that each is a mirror image of the other. Since the locking systems 1000, 2000 differ only in the type of latch assemblies they employ, all four of FIGS. 14–17 utilize the same numerals in referring to identical components and features of the depicted operating assemblies 1100 and links 1800.

While rigid, elongate links 1800 (typically formed as stampings from metal) are depicted in FIGS. 14–17 as being utilized to connect the operating assemblies 1100 to the latch assemblies 1010, 2100, those who are skilled in the art will understand that a variety of other types of linkage (e.g., including flexible links comprised of chain or woven steel cable, not shown) may be substituted for the rigid links 1800. While the links 1800 of the lock embodiments 1000, 2000 connect with the operating assemblies 1100 in a manner that permits the operating assemblies 1100 to exert a "tension" or "pulling" type of force along the links 1800, those who are skilled in the art will understand that the operating assembly 1100 also is well suited for use in applying a "compression" or "pushing" type of force (along a set of suitably rigid links, not shown) to operate such latch mechanisms as may require this type of force application to "unlatch."

While the operating assembly 1100 is depicted in the drawings as employing pairs of links 1800 that connect with only two of the latches 1010, or with only two of the latches 2100, those who are skilled in the art will understand that suitable linkage may be substituted for one or both of the links 1800 for connecting with smaller or larger numbers latches (not shown) to effect concurrent "unlatching" of more or less than two latches. Moreover, while the drawings depict latches 1010 having spring-projected slide bolts 1020, and latches 2100 having rotary latch bolts 2110, it will be understood that the operating assembly 1100 may be used with a variety of other types of commercially available latch assemblies.

Figure 32:
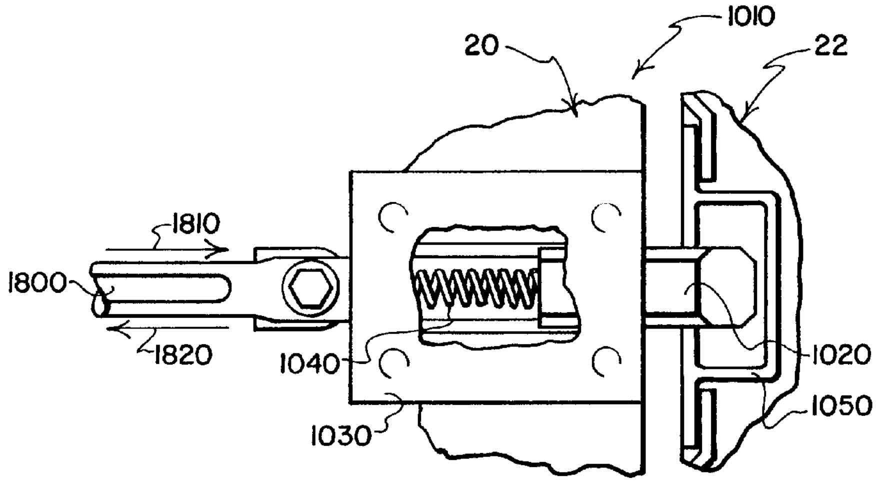
FIG. 32 is a front side elevational view, or an enlarged scale, of one of the latch assemblies of FIGS. 14–15, together with portions of an associated strike and portions of a door frame on which the strike is mounted, with portions thereof broken away to permit underlying features to be seen.

Referring to FIGS. 18–23 and 28, the closure 20 on which the operating assembly or "unit" 1100 is mounted typically is formed from at least one stamped metal sheet 32 (or as a welded assembly of metal sheets, not shown), with a generally rectangular mounting opening 34 (see FIG. 28) being provided, through which portions of the operating assembly 1100 project. The closure 20 is movable between open and closed positions with respect to nearby structure such as a door frame, portions of which are depicted in FIG. 32, as indicated by the numeral 22.

Figure 23:
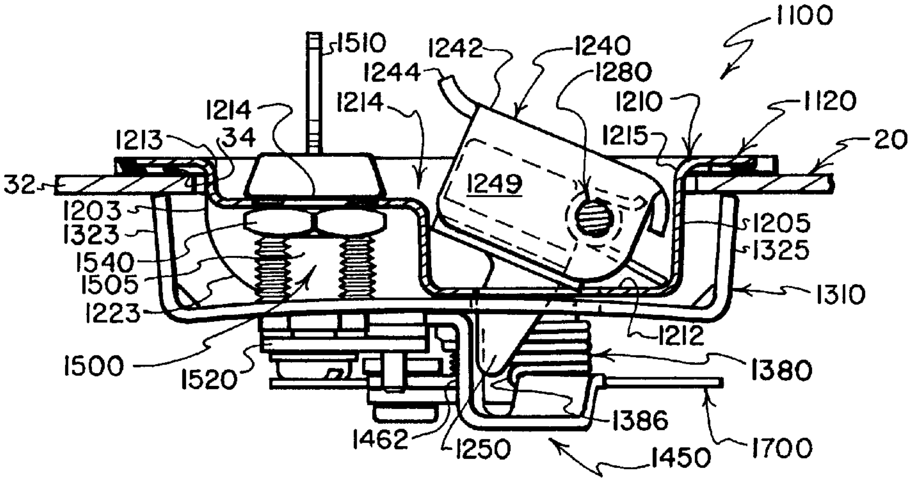
FIG. 23 is a sectional view as seen from a plane indicated by a line 23–23 in FIG. 22.
Figure 28:
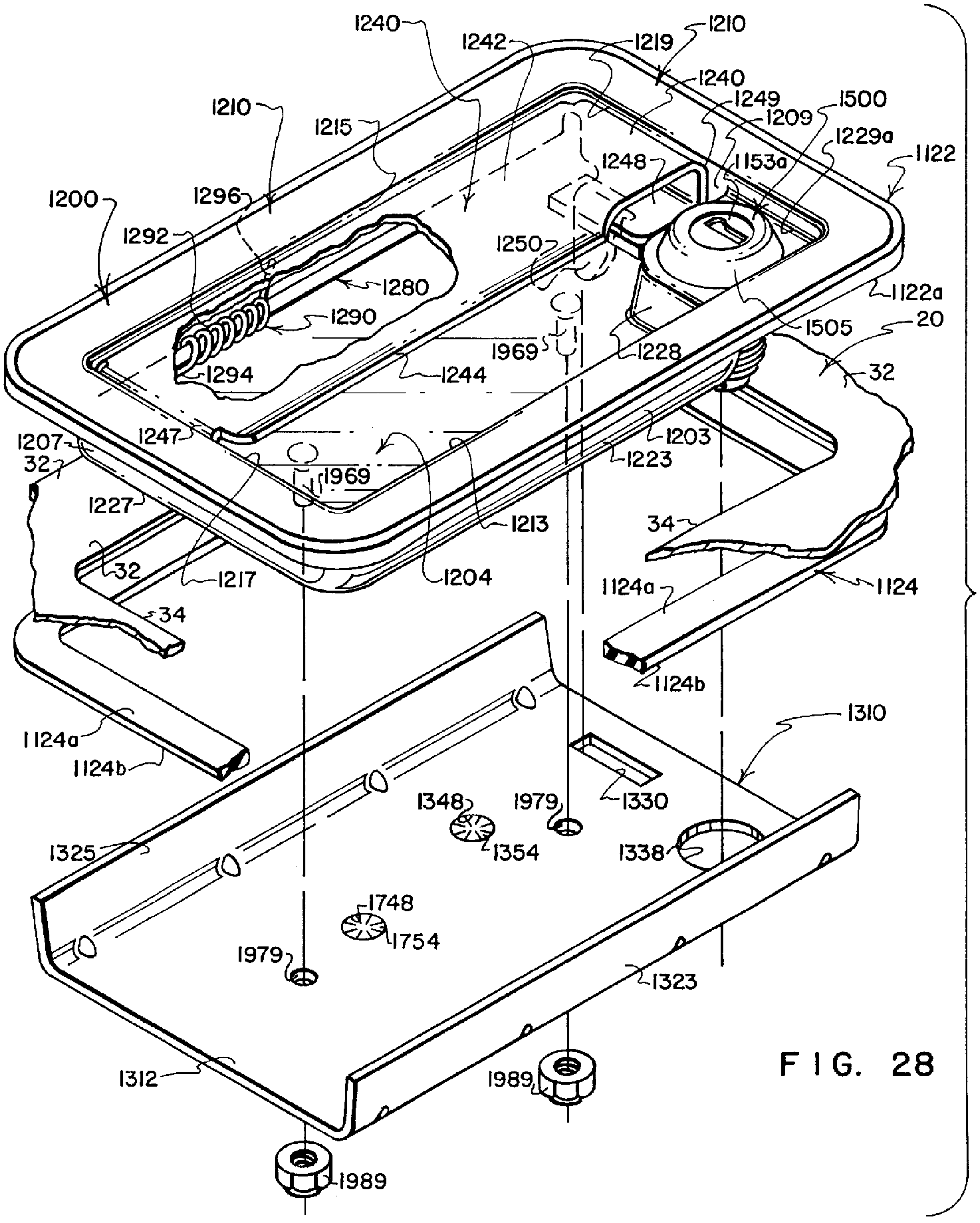
FIGS. 28, 29 and 30 are exploded front perspective views of selected components of the operating assembly of FIG. 14, with some components separated so as to be depicted individually, with other components shown assembled, and with some component portions broken away to permit underlying features to be viewed.
Figure 29:
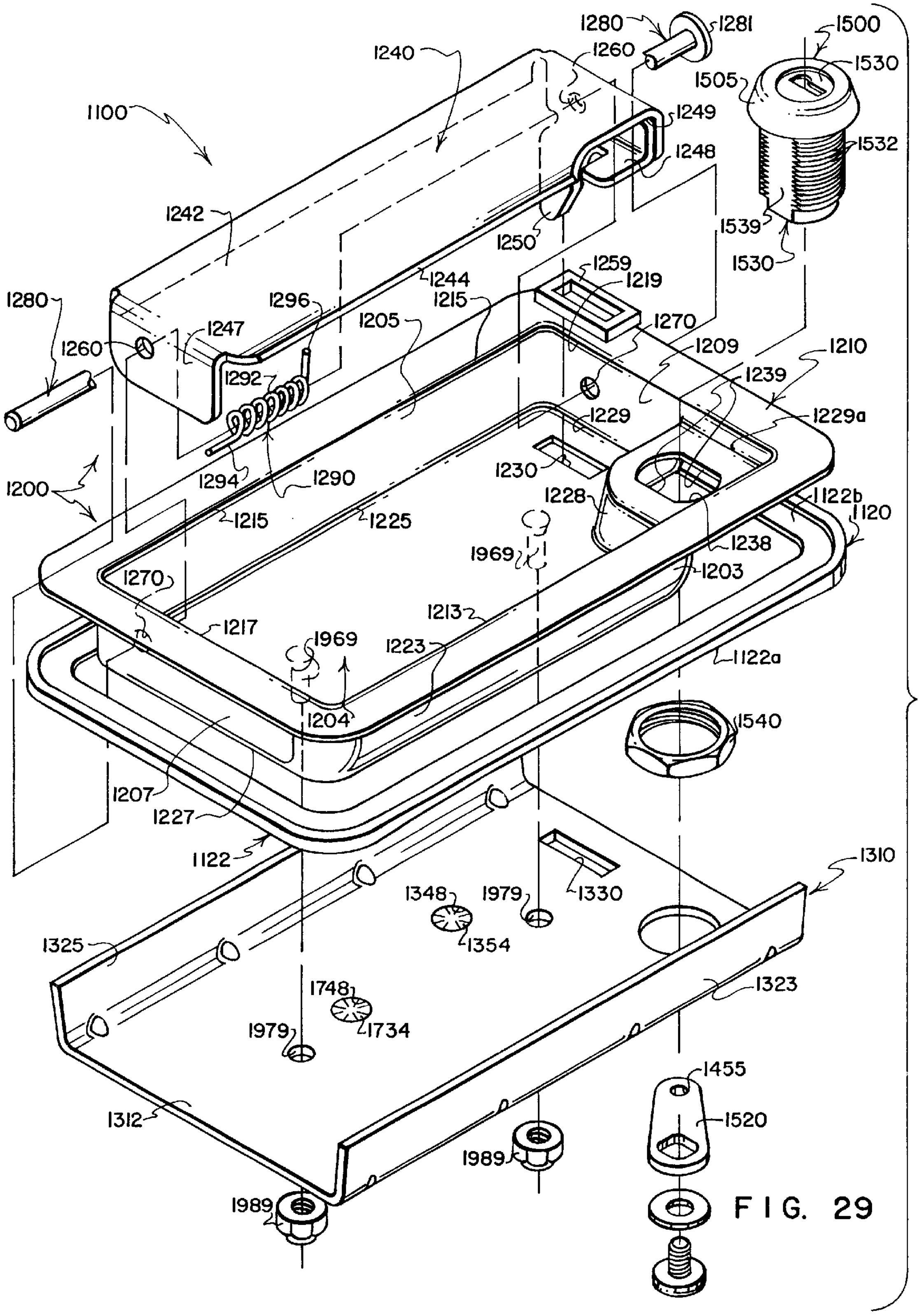

Two modular assemblies 1200 and 1300 form the operating assembly 1100:

1) Referring to FIG. 29, a "front modular assembly" or "handle and housing assembly" 1200 is comprised of: a pan-shaped housing 1210, a paddle handle 1240 positioned in a forwardly-facing recess 1204 of the housing 1210, and a hinge pin 1280 that mounts the paddle handle 1240 on the housing for pivotal movement between a "non-operated" position (see FIGS. 18 and 21) and an "operated" position (see FIG. 23). If an optional torsion coil spring 1290 (see FIGS. 28 and 29) is interposed between the housing 1210 and the paddle handle 1240 (see FIGS. 28 and 29) for biasing the paddle handle 1240 toward its non-operated position, it is included in the components that comprise the front modular assembly 1200. Also included among the components of the front assembly 1200 is a lock cylinder assembly 1500 having a headed, threaded body 1505 that extends through a mounting hole 1238 defined by the housing 1210, with threads 1532 formed on the body 1505 to receive a hex nut 1540 for mounting the body 1505 on the housing 1210, with opposed flat surfaces 1539 being provided on opposite sides of the body 1505 for engaging corresponding flat surfaces 1239 that border opposite sides of the mounting hole 1238, and with the cylinder assembly 1500 including a generally cylindrical core 1510 that is journaled by the body 1505 for supporting at its rear end region a cam 1520 that can rotate only within a quarter-turn range of movement relative to the body 1505 between a "locked" position (see FIGS. 20 and 24) and "unlocked" position (see FIGS. 20 and 24) in response to corresponding quarter-turn rotations of a suitably configured key 1510 (see FIGS. 21 and 23) inserted into the front end region of the core 1530.
2) Referring to FIGS. 30 and 31, a "rear modular assembly" or "bracket and linkage assembly" comprises a mounting bracket 1310; an operating linkage 1450 that includes first and second overlying arms 1451, 1453 that have aligned slots 1461, 1463 formed therethrough, and a pin-type connecting element 1467 that is carried by a locking link 1465 (which is connected to the cam 1510 of lock cylinder 1500 by a pivot pin 1455, best seen in FIG. 29); and, a T-shaped link 1700 that has its central region pivotally connected to the bracket 1310 by a pivot pin 1750, that has a short central stem 1780 pivotally connected to the second arm 1453 by a pivot pin 1784, and that has opposed and regions 1790 of the cross-arm 1773 pivotally connected to the elongate latch-operating links 1800 by pivot pins 1785 (see FIGS. 17 and 19).

Figure 20:
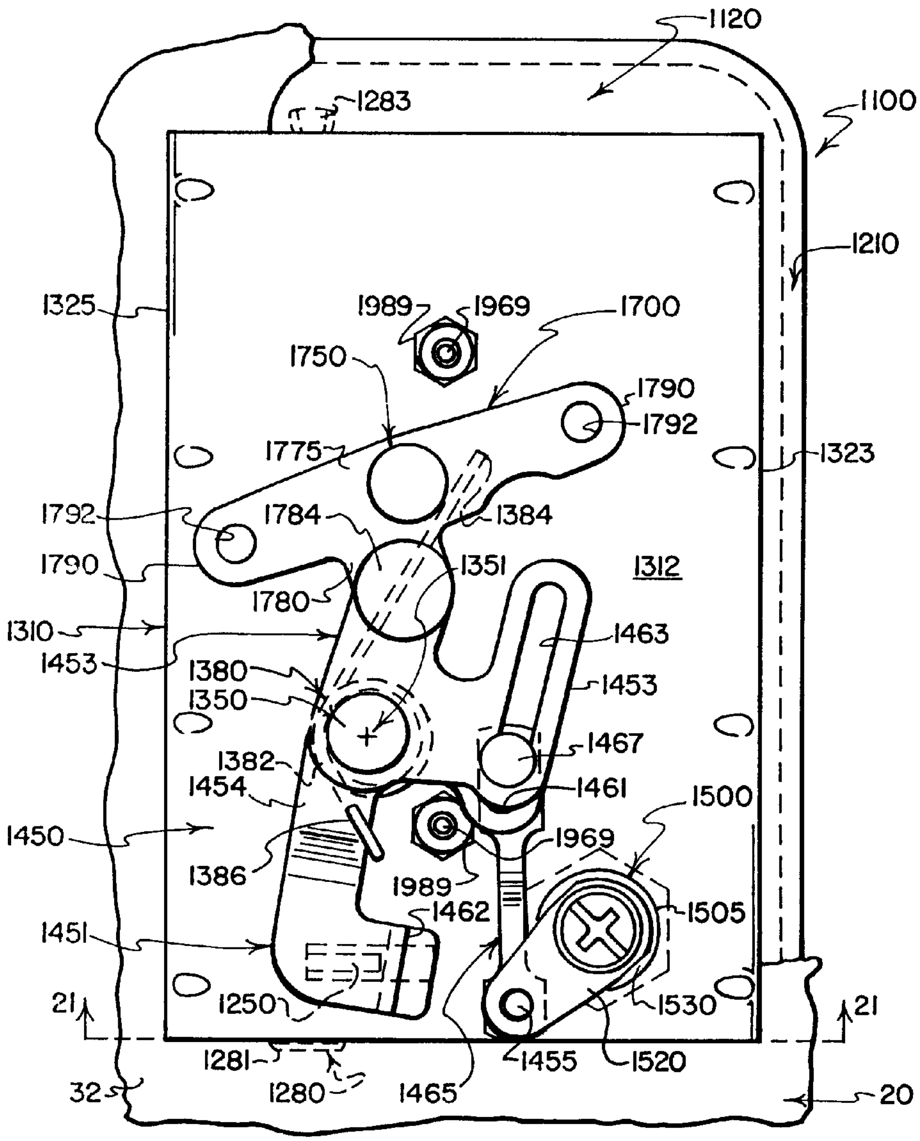
FIG. 20 is a bottom plan view thereof, with its relatively movable components positioned as they appear when the paddle handle is "non-operated" and the lock cylinder is "locked;"
Figure 21:
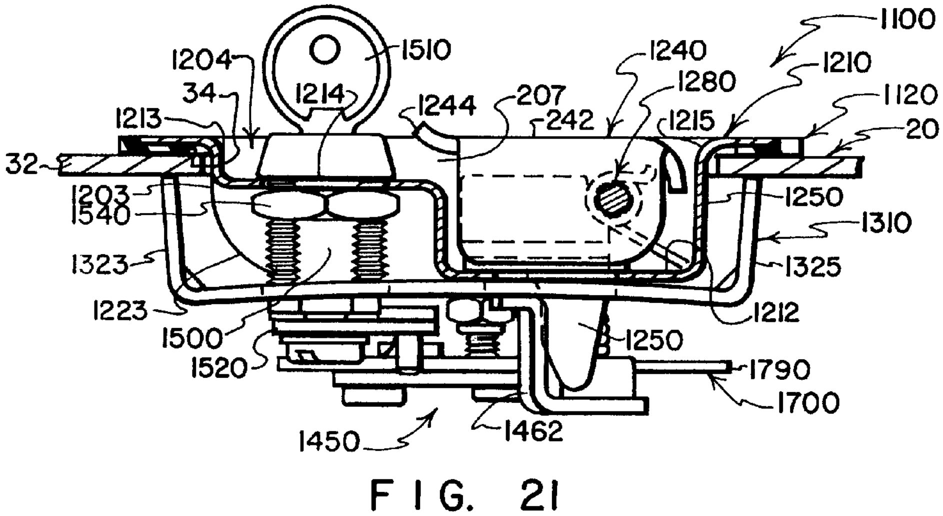
FIG. 21 is a sectional view as seen from a plane indicated by a line 21–21 in FIG. 20, with a key inserted in the lock cylinder.
Figure 22:
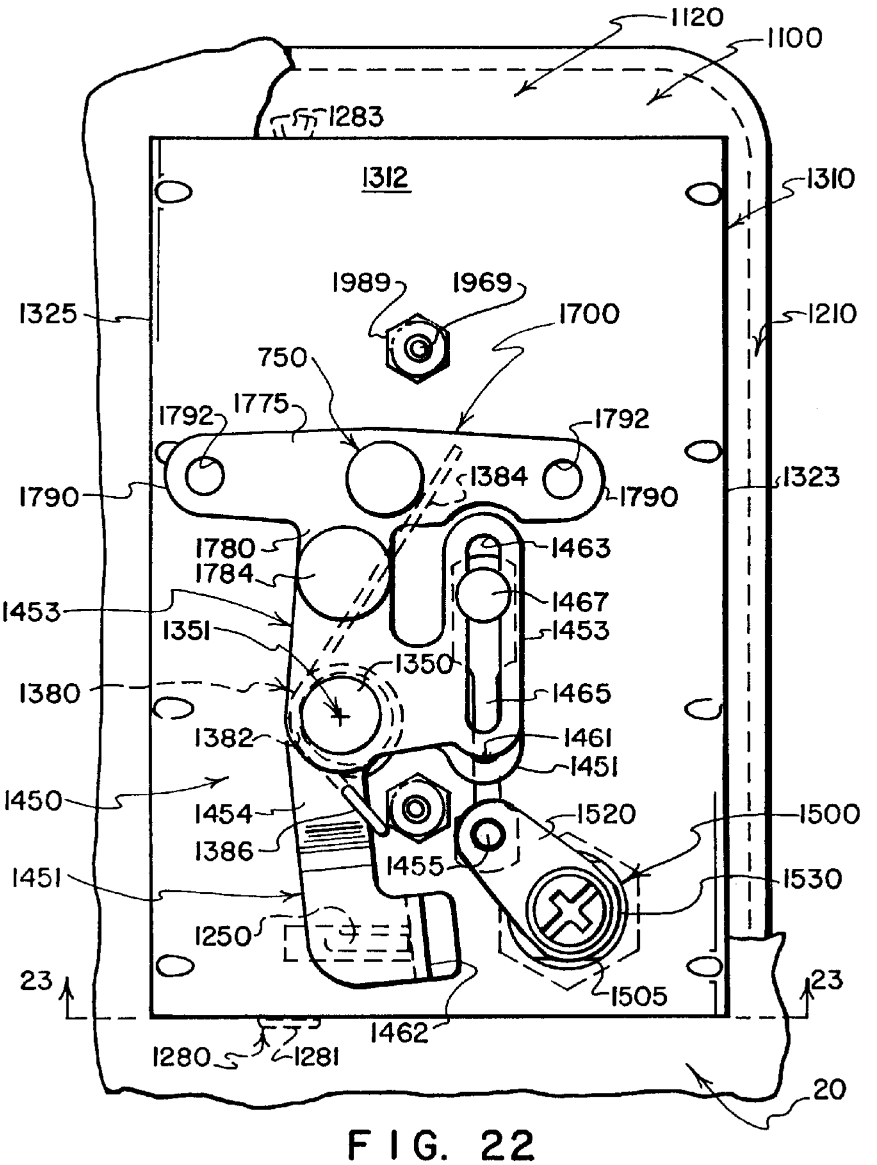
FIG. 22 is a bottom plan view similar to FIG. 20 but with relatively movable components positioned as they appear when the paddle handle is "operated" and the lock cylinder is "unlocked;"

Before turning to a more detailed description of the various components of the front and rear modules 1200, 1300 of the operating assembly or "unit" 1100, a brief overview of the unit's "linkage disconnect" locking system is provided. Referring to FIGS. 21 and 23, the paddle handle 1240 has a rearwardly extending projection 1250 that engages an end region 1462 of the first arm 1451 for pivoting the first arm 1451 in response to pivoting of the handle 1240 from its non-operated position (FIG. 21) to its operated position (FIG. 23). Referring to FIGS. 20 and 22, a torsion spring 1380 is provided for biasing the first arm 1451 to assist in maintaining engagement between the end region 1462 and the handle projection 1250, which causes the first arm 1451 to pivot back toward its normal, non-operated position (FIG. 21) when the handle 1240 is pivoted back to its non-operated position (FIG. 21). What this means is that the first arm 1451 and the paddle handle 1240 tend to pivot in unison—and, the handle projection 1250 tends to always engage the end region 1462 of the first arm 1451.

Likewise, the second arm 1453 moves concurrently with pivotal movement of the T-shaped link 1700 because these elements are drivingly connected by the pivot pin 1784. Thus, if the first and second arms 1451, 1453 are drivingly connected so as to pivot in unison about the common pivot axis 1351 of the pin 1350, the T-shaped link 1700 will be caused to pivot to effect latch-operating movement of the elongate links 1800 when the paddle handle 1240 pivots from its non-operated to its operated position.

What the "disconnect" feature accomplishes is to provide a means for disconnecting the first and second arms 1451, 1453 so they do not pivot in unison about the common pivot axis 1351 when the paddle handle 1240 is pivoted about the axis of the hinge pin 1280—i.e., so that no movement (or only a harmless minimal amount of movement) of the second arm 1453 will result when the paddle handle 1240 pivots from its non-operated position to its operated position—so that no significant movement of the T-shaped link 1700 will take place that causes the elongate links 1800 to operate the latches to which the links 1800 are connected.

Figure 25:
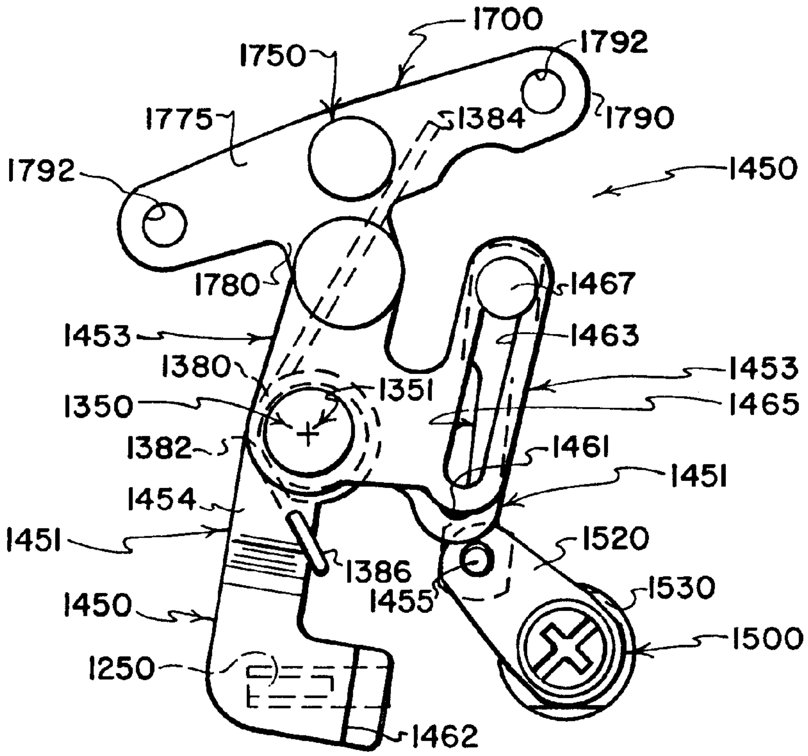
FIG. 25 is a bottom plan view similar to FIG. 24 but with the relatively movable components positioned as they appear when the paddle handle is "nonoperated" and the lock cylinder is "unlocked;"

Establishing a driving connection between the arms 1451, 1453 to ensure that they will rotate in unison is accomplished simply by moving the pin-type connecting element 1467 to upper end regions of the aligned slots 1461, 1463, as depicted in FIGS. 22 and 25 by operating the lock cylinder 1500 to pivot the cam 1520 to move the locking link 1465. When in the "connect" position shown in FIGS. 22 and 25, the connecting element 1467 is relatively closely received within the slots 1461, 1463 and serves to transmit torque force between the first and second arms 1451, 1453 that causes the arms 1451, 1453 to pivot in unison about the common axis 1351.

Figure 26:
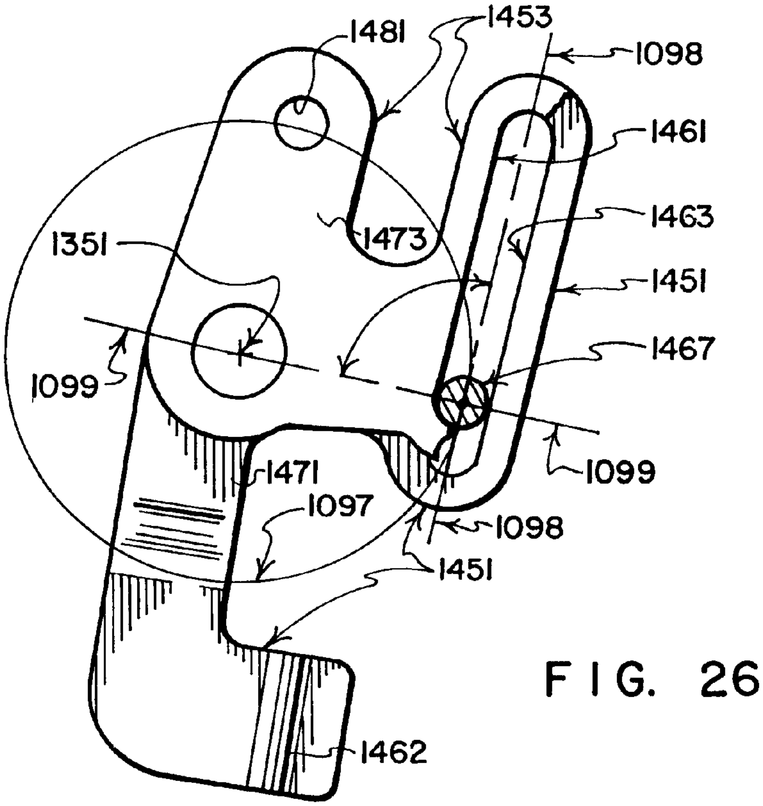
FIG. 26 is a bottom plan view, on an enlarged scale, showing two overlying arms of the operating linkage in the same positions as shown in FIG. 20, with a pin-type connecting element shown in its "locked" or "disconnect" position, and with the common axis about which the arms pivot also being shown.

To establish a disconnect (i.e., no driving connection) between the arms 1451, 1453 to permit the first arm 1451 to pivot freely about the common axis 1351 without causing (any significant) corresponding movement of the second arm 1453 (so that the paddle handle 1340 can pivot freely about the axis of the hinge pin 1280 without causing latches that are coupled to the operating assembly 1100 to be operated), the connecting element 1467 is moved to a "disconnect" location near the lower end regions of the aligned slots 1461, 1463, as depicted in FIG. 26.

When in the disconnect position of FIG. 26, the locking element 1467 is located where an imaginary line 1098 paralleling the length of the aligned slots 1461, 1463 intersects with a substantially perpendicular imaginary line 1099 that intersects with the common pivot axis 1351. At this location, the aligned slots 1461, 1463 are oriented to extend tangentially with respect to an imaginary circle 1097 that is centered about the common axis 1351. Should the first arm 1451 (which has a relatively longer slot 1461 that extends in both directions from the location of the pin-type connecting element, as depicted in FIG. 26) attempt to pivot by a only a very minimal amount (when the connecting element is at the "disconnect" location), all that will happen is that the slightly moving arm 1451 will cause the sidewalls of the slightly moving slot 1461 to slide a short distance along opposite sides of the pin-type connecting element 1467—a harmless type of movement that imposes no significant force on the pin-type connecting element 1467 and therefore does nothing to attempt to move the connecting element from the position where it is held by the locking link 1465.

Figure 27:
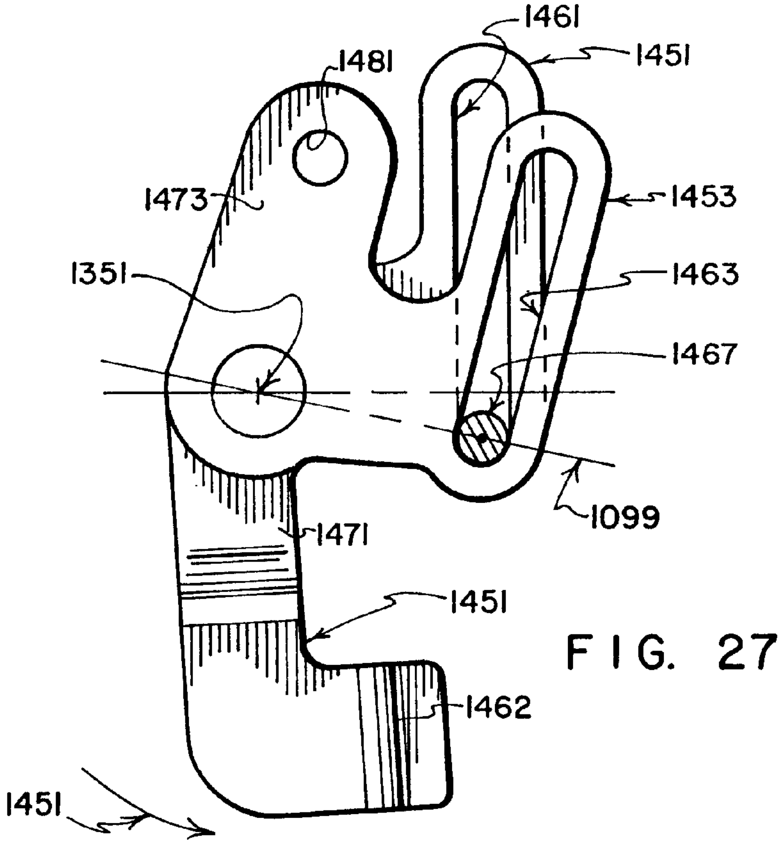
FIG. 27 is a bottom plan view similar to FIG. 26, but with the arms pivoted about the common axis to the same positions as shown in FIG. 24, with the pin-type connecting element shown in its "locked" or "disconnect" position.

To achieve a bit more than a minimal amount of pivotal movement of the first arm 1451 without causing corresponding movement of tile second arm 1453, one approach that can be taken is to provide a bit of "play" in the manner in which the pin-type connecting element 1467 is received in the slots 1461, 1463—a bit of simple "looseness" that will let tile first arm 1451 pivot from the position shown in FIG. 26 to the position shown in FIG. 27 without causing the pin-type connecting element 1467 to become so wedged or otherwise forcefully engaged as to transmit driving force from the first arm to the second arm. However, if "play" or "looseness" between the connecting element 1467 and the slots 1451, 1453 is undesirable, then one or both of the lower end regions of the slots 1451, 1453 can be slightly enlarged—in the manner that has already been described in detail in conjunction with the operating assembly embodiment 100, as is illustrated in FIG. 1 wherein an end region enlargement 271 is provided in the first slot 261 of the first arm 251 to permit the first arm 251 to pivot without causing corresponding pivotal movement of the second,arm 253.

What the approach taken in the operating assembly embodiment 1100 illustrates is that "linkage disconnect" locking actually can be achieved in many instances by utilizing a pair of simple linear slots—if careful attention is paid to the orientation of tile slots so that the connecting element can have its disconnect location defined where the slots extend substantially tangentially to a circle having the common pivot axis as its center.

Figure 18:
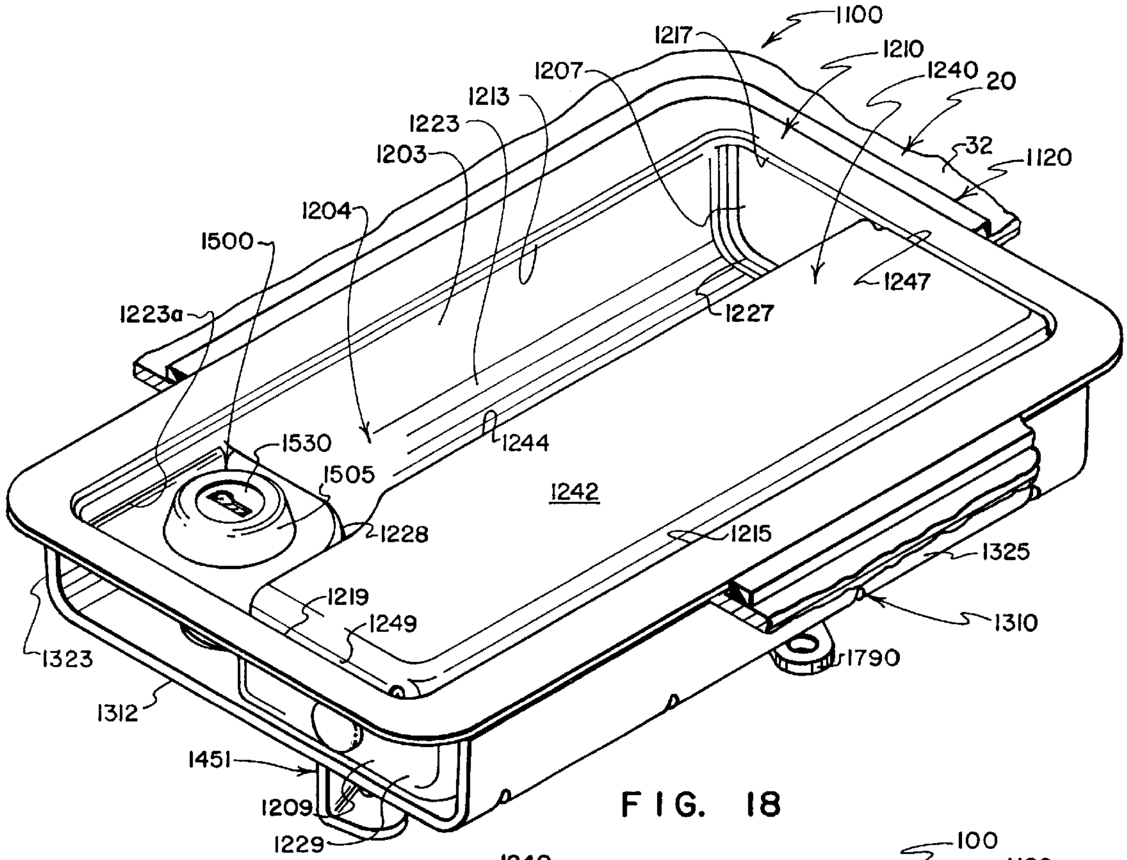
FIG. 18 is a perspective view of the operating assembly of FIG. 14.
Figure 19:
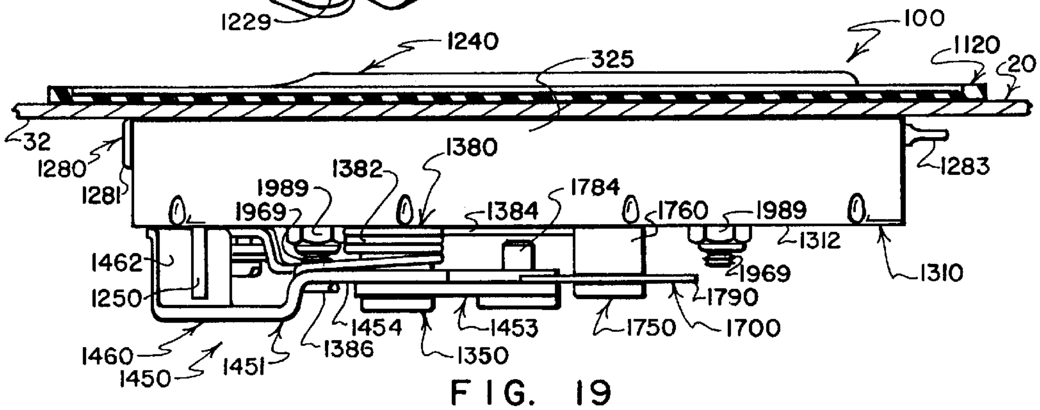
FIG. 19 is a side elevational view thereof.

Turning now to a more detailed description of the components of the front modular assembly, and referring to FIGS. 18, 28 and 29, the pan-shaped housing 1210 is a generally rectangular metal stamping having a perimetrically extending, substantially flat mounting flange 1202 which surrounds a forwardly facing recess 1204. When the housing 1210 is installed on the closure 20, a suitable gasket 1120 preferably is provided to underlie the mounting flange 1202 and to surround the mounting opening 34. Opposed, relatively long side walls 1203, 1205, and opposed, relatively short end walls 1207, 1209 are joined by small radius bends 1213, 1215, 1217, 1219 to the flat mounting flange 1202.

A majority of the recess 1204 is relatively deep, and is closed by a main back wall portion 1212 that is substantially flat. A corner region of the recess 1204 located near the juncture of the side and end walls 1203, 1209 is more shallow, and is closed by a minor back wall portion 1214 that also is substantially flat. Relatively small radius bends 1223*a* (FIG. 18), 1229*a* (FIGS. 28–29) join portions of the side and end walls 1203, 1209 to the minor back wall portion 1214. A curved wall 1228 joins the minor back wall portion 1214 to the main back wall portion 1212, with small radius bends being provided where the curved wall 1228 joins with the back wall portions 1212, 1214. Referring variously to FIGS. 18, 28 and 29, relatively small radius bends 1225, 1227, 1229 join portions of the side and end walls 1205, 1207, 1209 to the main back wall portion 1212. A relatively larger radius bend 1223 joins portions of the side wall 1203 to the main back wall portion 1212.

Referring to FIG. 29, a main back wall opening 1230 is formed through the main back wall portion 1212; and, a lock mounting hole 1238 is formed through the minor back wall portion 1214. The main back wall opening 1230 is elongate, generally rectangular, is spaced a short distance from the housing end wall 1229, and extends parallel to the housing end wall 1229. The lock mounting hole 1238 is generally circular except for two flats 1239 formed along opposite sides thereof.

Referring principally to FIGS. 28 and 29, the paddle-shaped handle 1240 has a generally rectangular front wall 1242 with a forwardly-turned lip 1244 formed along one edge. Rearwardly-turned end flanges 1247, 1249 border opposite ends of the rectangular front wall 1242 and extend alongside the housing end walls 1207, 1209, respectively. The end flange 1249 has an inwardly-turned extension 1248 that parallels the front wall 1242 of the handle 1240, and that carries a rearwardly projecting tab-like formation 1250 that extends through the main back wall opening 1230. Referring to FIG. 29, an optional, generally rectangular gasket 1259 may be provided to surround portions of the projection 1250 at a location adjacent the back wall opening 1230.

Referring to FIG. 29, the hinge pin 1280 extends through aligned holes 1260 that are formed through the end walls 1207, 1209 of the pan-shaped housing 1210, and through aligned holes 1270 that are formed through the rearwardly-turned flanges 1247, 1249 of the paddle-shaped handle 240 to pivotally mount the handle 240 on the housing 1210. A head 1281 is formed on one end of the pin 1280. Once the pin 1280 has been inserted through the holes 1260, 1270 to pivotally mount the handle 1240 on the housing 1210, a crimp 1283 is formed (see FIG. 20) to prevent removal of the pin 1280 from the holes 1260, 1270.

Referring to FIGS. 28 and 29, the optional torsion coil spring 1290 has a coiled central region 1292 that extends loosely about the hinge pin 1280 at a location between the rearwardly-turned flanges 1246 of the handle 1240, and has opposed end regions 1294, 1296 that engage the back wall 1212 and the handle 1240, respectively, to bias the handle 1240 away from its "extended" or "operated" position (see FIG. 23) toward its "nested" or "non-operated" position (see FIGS. 18, 21 and 28). The spring 1290 is optional because the spring 1380 that is provided on the rear modular assembly 1300 can be made strong enough to act through the operating linkage 1450 to bias the handle 1240 toward its non-operated position.

When the operating handle 1240 is moved away from its nested, non-operated position toward its extended, operated position (by pivoting about the axis of the pin 1280), the rearwardly extending handle tab projection 1250 is caused to move within the back wall opening 1230 (from a normal or "first" position that is depicted in FIG. 21 to a "second" position that is depicted in FIG. 23). As will be explained shortly, this movement of the tab 1250 within the confines of the back wall opening 1230 causes the first arm 1451 of the operating linkage 1450 to move from a normal or "primary" or non-operated position of the operating arm 1450 (depicted in FIGS. 20 and 21) to a "secondary" or operated position (depicted in FIGS. 22 and 23).

Figure 30:
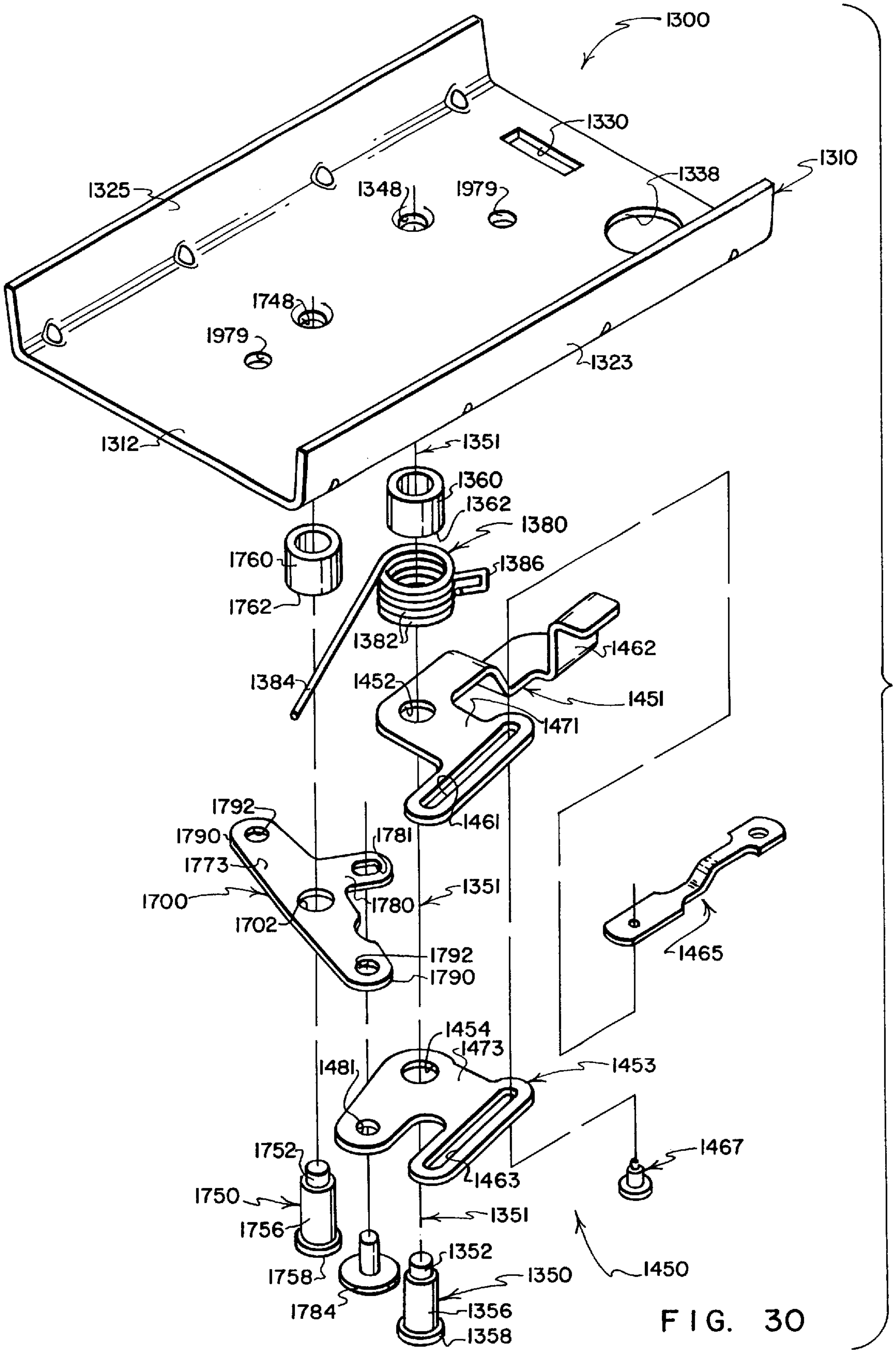

Turning now to features of the rear modular assembly 1300, and referring to FIGS. 28, 29 and 30, the mounting bracket 1310 has a relatively flat, generally rectangular shaped central region 1312 with a forwardly turned side flanges 1323, 1325 configured to extend along the full lengths of the housing side walls 1203, 1205 when the front and rear modules 1200, 1300 are assembled.

An elongate, generally rectangular opening 1330 is formed through the flat central portion 1312 of the mounting bracket 1310 to align with the main back wall opening 1230 when the mounting bracket 1310 is mounted together with the front modular assembly 1200 on the closure 20. The alignment of the openings 1230, 1330 enables the rearwardly projecting formation 1250 of the handle 1240 to extend through the opening 1330 to engage the end region 1462 of the first arm 1450. A feature that is provided by the closely spaced, aligned housing and mounting bracket openings 1230, 1330 is that they cooperate to protectively enshroud the rearwardly projecting formation 1250 to prevent it from bending or breaking either during normal service or as the result of tampering.

Optionally formed through the flat central portion 1312 of the mounting bracket 1310 is a circular opening 1338 that is located to align with the lock mounting opening 1238 of the pan-shaped housing 1210 to permit the lock assembly 1500 to pass therethrough in a close fit. A feature that is provided by the close fit of the circular opening 1338 about body portions of the lock assembly 1500 is that the material of the mounting bracket 1310 that extends about the opening 1338 will help to reinforce and rigidify the mounting of the lock assembly 1500 in the lock mounting hole 1238 to prevent damage from occurring due either to extensive normal service or as the result of tampering or forcing of the operating assembly 1100.

Referring to FIG. 30, tapered holes 1348, 1748 are formed through the flat central portion 1312 of the mounting bracket 1310 to receive reduced diameter end regions 1352, 1752 of mounting posts 1350, 1750, respectively. The mounting posts 1350, 1750 are rigidly attached to the mounting bracket 1310 by deforming and expanding the reduced diameter end regions 1352, 1752 to form an enlarged heads 1354, 1754 that substantially fill the tapered holes 1348, 1748, as is depicted in FIG. 28.

Figure 31:
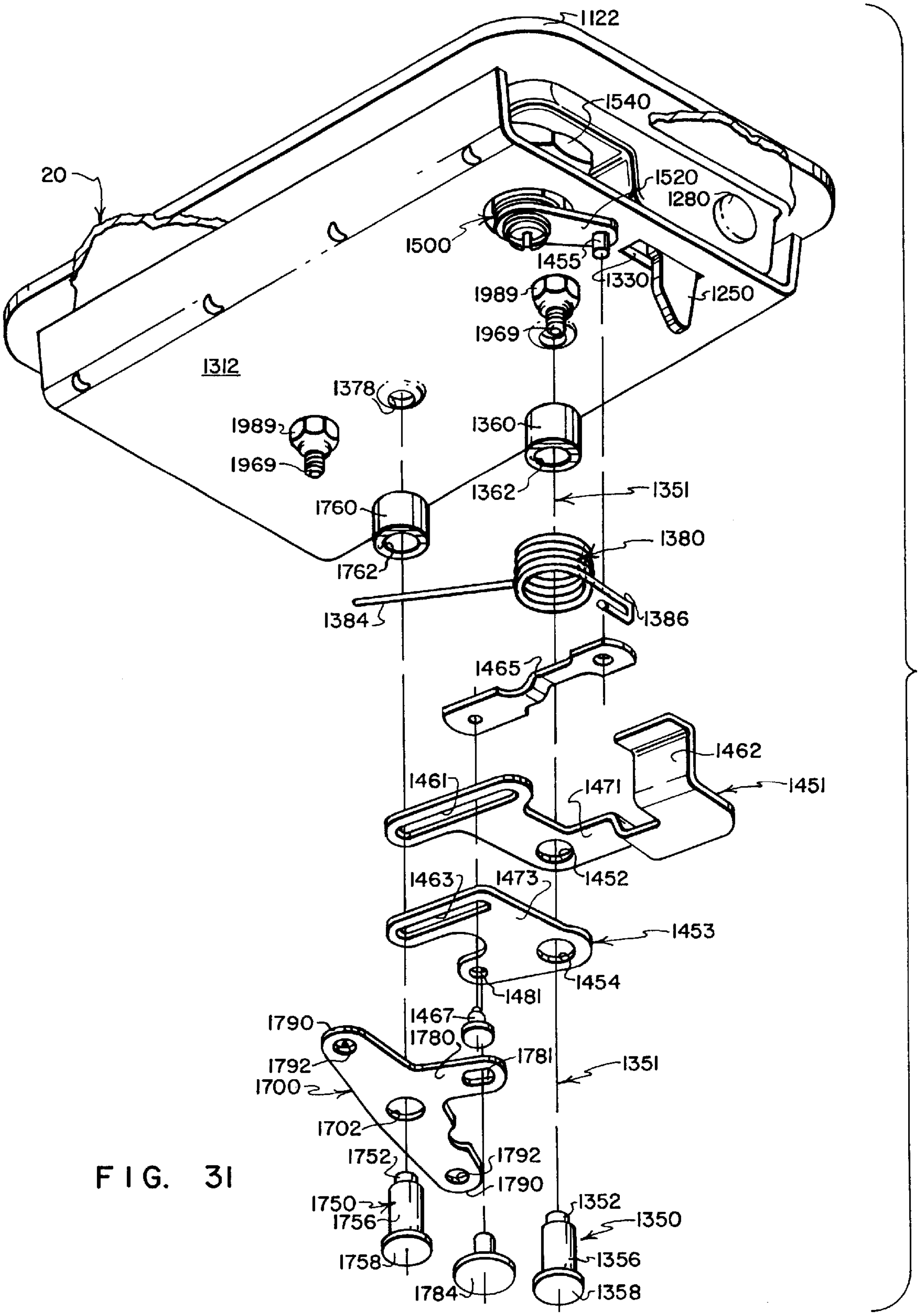
FIG. 31 is an exploded rear perspective vies showing selected components of the operating assembly of FIG. 14, with some components separated so as to be depicted individually, and with other components shown assembled.

Referring to FIGS. 30 and 31, the mounting posts 1350, 1750 have generally cylindrical central regions 1356, 1756 that extend rearwardly to where enlarged heads 1358, 1758 are formed, respectively. Sleeves 1360, 1760 are mounted in a slip fit on the central regions 1356, 1756 and extend rearwardly from the flat central wall 1312 of the mounting bracket 1310 to define ends 1362, 1762 that are spaced short distances from the lead formations 1358, 1758.

The first and second arm 1451, 1453 have mounting holes 1452, 1454 that are sized to receive the central region 1356 in a slip fit that will permit the arms 1451, 1453 to pivot smoothly relative to the mounting post 1350. The arms 1451, 1453 are mounted on the mounting post 1350 at a location between the head formation 1358 and the end 1362 of the sleeve 1360, with the central region 1356 extending through the mounting holes 1452, 1454.

In similar fashion, the T-shaped lever-type link 1700 has a mounting hole 1702 that is sized to receive the central region 1756 in a slip fit that will permit the link 1700 to pivot smoothly relative to the mounting post 1750. The T-shaped link 1700 is mounted on the mounting post 1750 at a location between the head formation 1758 and the end 1762 of the sleeve 1760, with the central region 1756 extending through the mounting hole 1702.

Referring still to FIGS. 30 and 31, a torsion coil spring 1380 has coils 1382 located between opposite ends 1384, 1386. The coils 1382 extend about the sleeve 1360 to mount the spring 1380 on the mounting post 1350 at a location between the flat wall 1312 of the mounting bracket 1310 and the first arm 1451. Referring to FIGS. 20 and 22, the spring end 1384 extends away from the mounting post 1350 to engage the sleeve 1760 that is carried on the mounting post 1750, while the spring end 1386 engages the first arm 1451 to bias the first arm 1451 (in a clockwise direction as viewed in FIGS. 20 and 22 away from the "secondary" position of the first arm 1451 depicted in FIG. 22 toward the "primary" position of the first arm 1451 depicted in FIG. 20).

The T-shaped lever-type link 1700 has a central leg or "stem" 1780 that extends away from a "bar" 1775 of the link 1700 (the "bar" 1775 and the "stem" 1780 cooperate to give the link 1700 its "T" shape). A connecting pin 1784 extends through aligned holes 1481, 1781 of the second arm 1453 and the link 1700 to provide a pivotal connection therebetween. A pair of connecting pins 1785 (see FIGS. 15 and 17) extend similarly through holes 1792 formed in the end regions 1790 of the "bar" 1775 and through aligned holes (not shown) formed in the links 1800 to pivotally connect the T-shaped link 1700 to the elongate links 1800.

Because the T-shaped lever-type link 1700 is pivotally connected to the operating arm 1450 by the connecting pin 1784, and because the elongate links 1800 are pivotally connected to the T-shaped lever-type link 1700 by the connecting pins 1785, the action of the torsion coil spring 1380 in biasing the first arm 1451 (in a clockwise direction as viewed in FIGS. 20 and 22) also causes the T-shaped lever-type link 1700 to be biased (in a counterclockwise direction as viewed in FIGS. 20 and 22 away from the "second" position of the link 1700 depicted in FIG. 22 toward the "first" position of the link 1700 depicted in FIG. 20), and also causes the elongate links 1800 to be biased in opposed directions (away from each other, in directions indicated by arrows 1810 in FIGS. 14–17).

However, when the first arm 1451 is pivoted about its mounting post 1350 in a counterclockwise direction (as viewed in FIGS. 20 and 22) away from the "primary" position of the first arm 1451 depicted in FIG. 20 toward the "secondary" position of the first arm 1451 depicted in FIG. 22), the pivotal interconnection of the second arm 1453 with the T-shaped lever-type link 1700, and the pivotal interconnection of the T-shaped link 1700 with the elongate links 1800 causes the T-shaped link 1700 to be pivot about its mounting post 1750 (in a clockwise direction as viewed in FIGS. 20 and 22 away from the "first" position of the link 1700 depicted in FIG. 20 toward the "second" position of the link 1700 depicted in FIG. 22), and also causes the elongate links 1800 to execute "unlatching" movements (toward each other, in directions indicated by arrows 1820 in FIGS. 14–17).

Referring again to FIGS. 30 and 31, the first arm 1451 has a substantially flat central region 1471 through which the mounting hole 1452 is formed. The second arm 1453 has a substantially flat central region 1473 through which the holes 1454, 1781 are formed.

Figure 24:
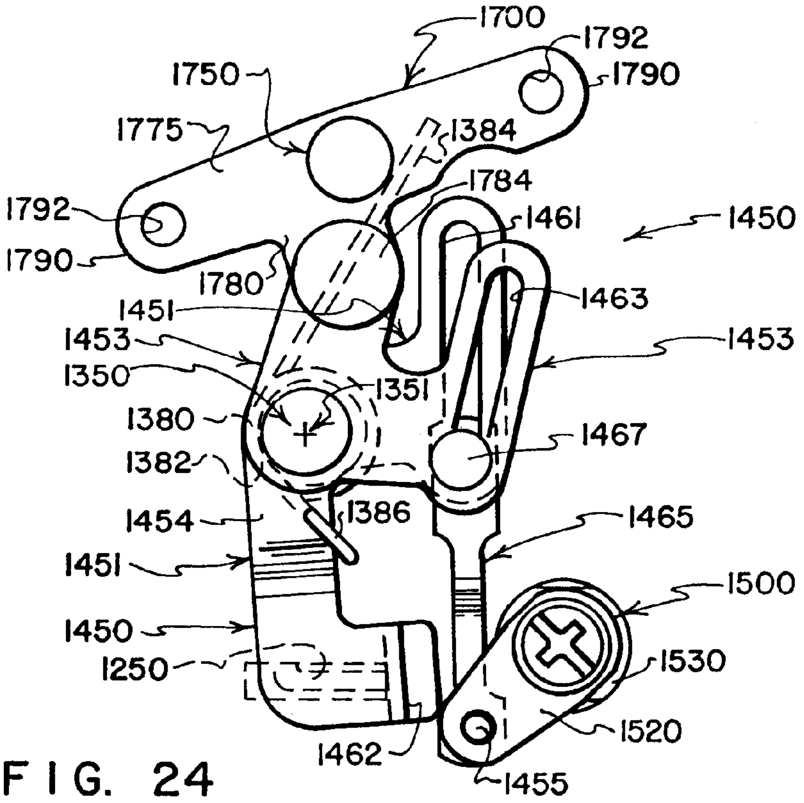
FIG. 24 is a bottom plan view similar to FIG. 20 but showing only selected components of the operating assembly, with relatively movable components positioned as they appear when the paddle handle is "operated" and the lock cylinder is "locked;"

If desired, the end region 1462 of the first arm 1451 can be configured to engage the locking link 1465 (near where the locking link is pivotally connected to the cam 1520 of the lock cylinder assembly 1500) as is depicted in FIG. 24 to limit the movement of the T-shaped link 1700 when the operating assembly 1100 is locked—to prevent "jimmying" of such latches as may be connected to the elongate links 1800, or for other purposes.

The operating assembly 1100 can, of course, be used with a wide variety of commercially available latch assemblies—for example the latch assemblies 1100 that are sold by the Eberhard Manufacturing Co. division of The Eastern Company, Strongsville, Ohio 44136 under the product designations 4974–52. Referring to FIG. 32, the latch assembly 1010 has a welded casing 1030 that houses portions of the latch bolt 1020 together with a compression coil spring 1040 that biases the latch bolt 1020 toward an extended position that is depicted in FIGS. 14, 15 and 32 wherein the latch bolt 1020 engages a conventional strike 1050 that is carried by the door frame portions 22. When the link 1800 is moved in the direction of the arrow 1820 to retract the latch bolt 1020, the latch bolt 1020 disengages the strike 1050, as will be readily understood by those who are skilled in the art.

Figure 33:
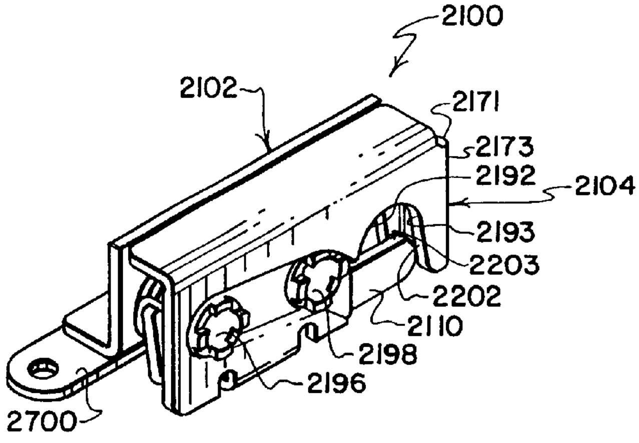
FIGS. 33 and 34 are perspective views taker from different directions of one of the rotary latch assemblies of FIGS. 16–17.
Figure 34:
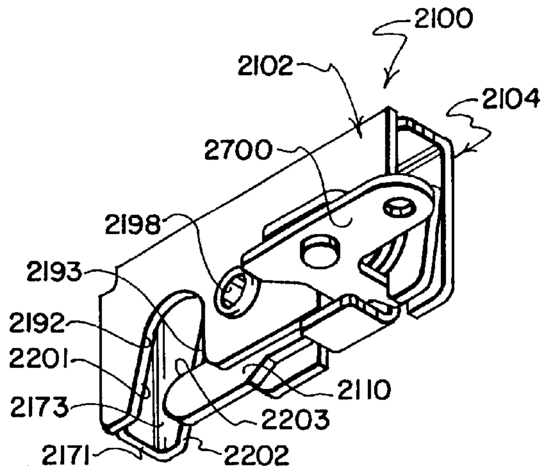
Figure 36:
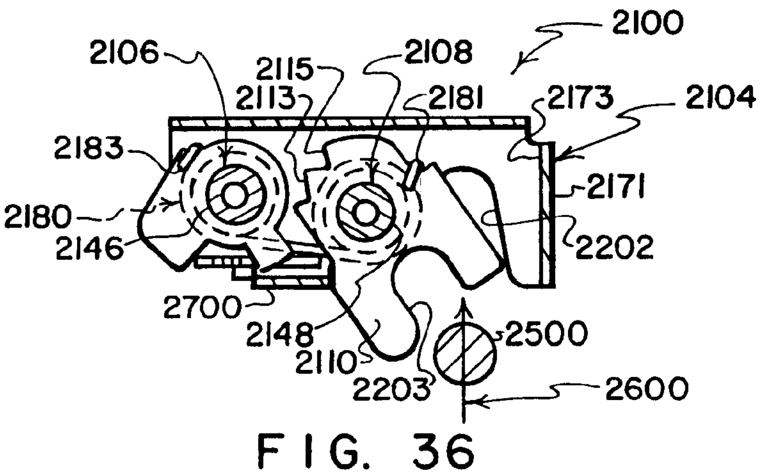
Figure 37:
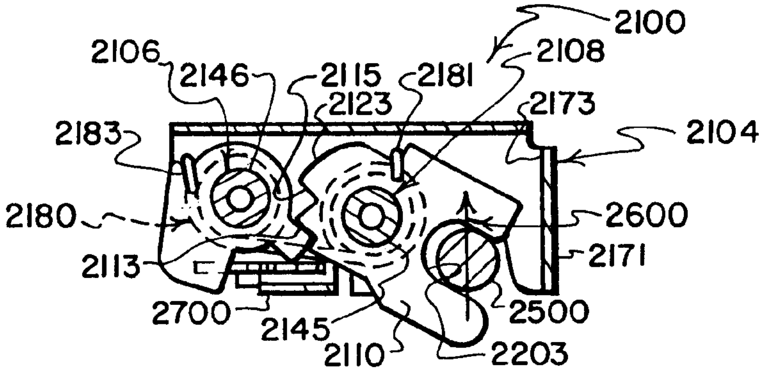
Figure 38:
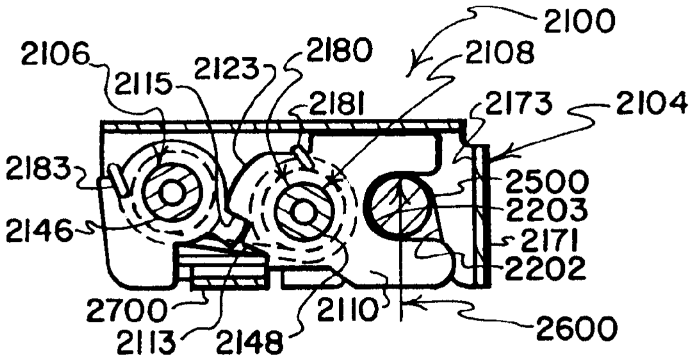

If the operating assembly 1100 is to be used with a pair of rotary latches, the rotary latches preferably are of a type that will be described shortly in conjunction with FIGS. 33–35. FIGS. 36–38 are provided to schematically illustrate how a typical one of the latches 2100 performs during three stages that occur as a suitably configured strike formation 2500.

A "suitably configured strike formation" 2500 for use with one of the rotary latches 2100 (referred to hereinafter simply as a "strike 2500") typically is a generally cylindrical part of a metal member (not shown) that is suitably attached to structure such as the door frame 22 and located so as to be engaged by and received in one of the latches 2100 (when the closure 20 is closed) in a manner that will be described shortly, so that the strike 2500 is releasably retained by the rotary latch assembly 2100.

Figure 35:
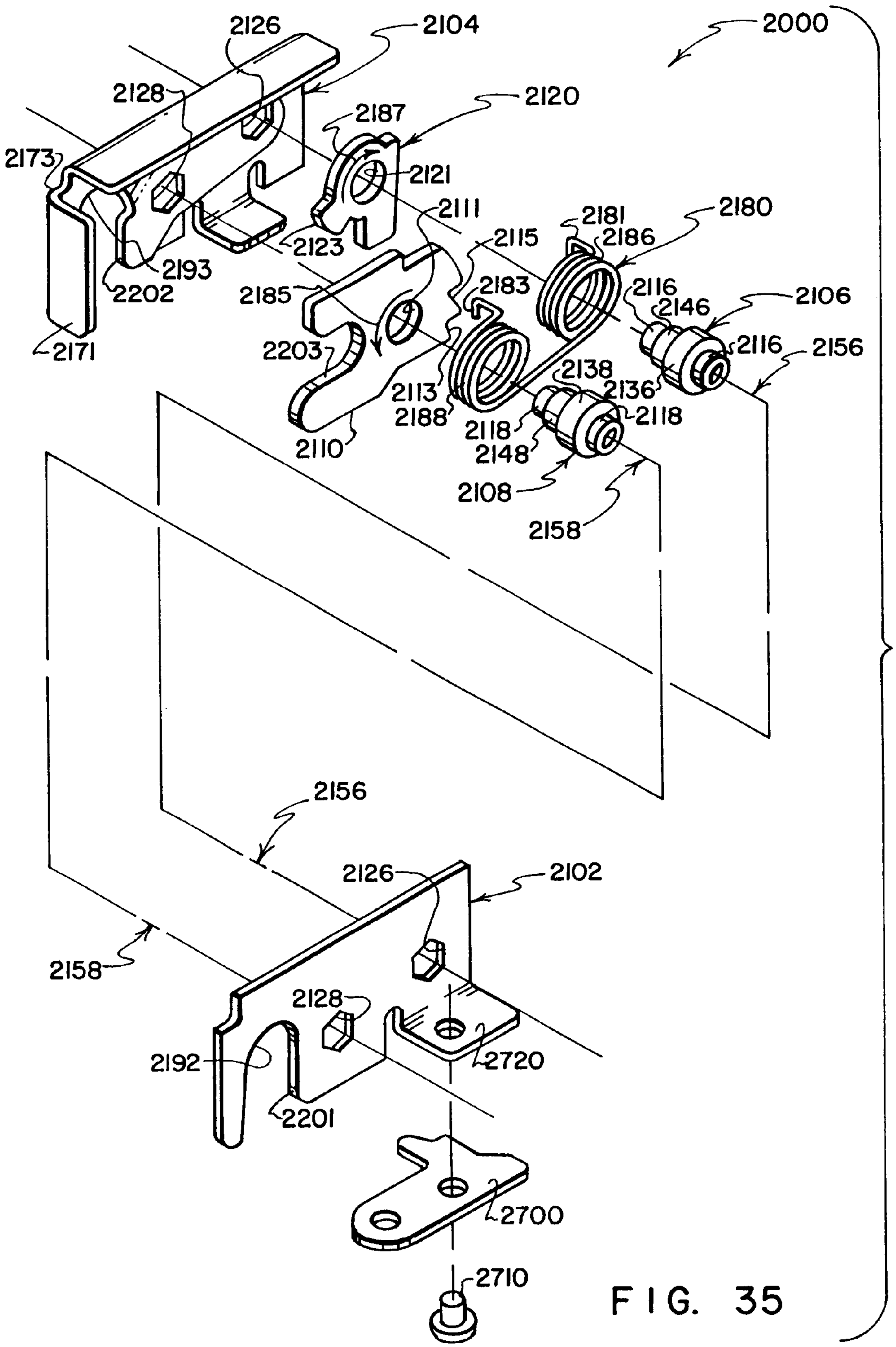
FIG. 35 is an exploded perspective view showing components of one of the rotary latch assemblies; and, FIGS. 36, 37 and 38 are sectional views, on an enlarged scale, as seen from a plane indicated by a line B–B in FIG. 17, and depicting somewhat schematically a sequence of three steps by which a suitably configured strike is received by one of the rotary latch assemblies of FIGS. 16–17, with FIG. 36 showing the latch assembly "unlatched" and the strike not yet engaging the latch assembly, with FIG. 37 showing the strike being received by the latch assembly and showing a preliminary latching orientation of latch components, and with FIG. 38 showing a fully latched configuration of the strike and latch assembly.

Referring to FIG. 35, each of the rotary latch assemblies 2100 has what will be referred to as a "housing" that consists of opposed first and second "housing side plates" 2102, 2104. The side plates 2102, 2104 are held in spaced, parallel relationship by first and second spacers or bushings 2106, 2108.

The first and second bushings 2106, 2108 are tubular (i.e., they have hollow interiors), and have reduced diameter end regions 2116, 2118 that are sized to be received in a slip fit within hex-shaped holes 2126, 2128 that are formed in the side plates 2102, 2104, respectively. To securely retain the hollow, reduced diameter end regions 2116, 2118 in the hex-shaped holes 2126, 2128 (to thereby rigidly interconnect the housing side plates 2102, 2104), the end regions 2116, 2118 are deformed and enlarged to form heads 2196, 2198 (see FIGS. 33 and 34) that have hollow interiors that tend to be of slightly hex shape after the end regions 2116, 2118 have been properly deformed to fully engage the sides of the hex-shaped holes 2126, 2128. Because the holes 2126, 2128 are hex-shaped, and because the hollow end regions 2116, 2118 are expanded (during formation of the leads 2196, 2198) to fully fill the hex-shaped holes 2126, 2128, good, secure, rotation-resistant connections are formed that rigidly interconnect the side plates 2102, 2104 and that resist loosening and rotation of the bushings 2106, 2108 relative to the side plates 2102, 2104.

Referring still to FIG. 35, the bushings 2106, 2108 are generally cylindrical, and provide stepped central regions that have relatively large diameter portions 2136, 2138 and relatively medium diameter portions 2146, 2148, respectively. The end and central regions 2116, 2136, 2146 of the bushing 2106 are concentric about a first transversely extending axis that is designated by the numeral 2156. The end and central regions 2118, 2138, 2148 of the bushing 2108 are concentric about a second transversely extending axis that is designated by the numeral 2158. Optional internal threads (not shown) may be formed within hollow interiors of the bushings 2106, 2108 to permit threaded fasteners of suitable size (not shown) to be connected to the rotary latch assemblies 2100 (should this be desirable, for example as an aid in mounting the latch assemblies 2100 on the closure 20).

The side plates 2102, 2104 define aligned first and second U-shaped notches 2201, 2202, respectively, that are oriented so that, as the closure 20 (on which the rotary latch assemblies 2100 are mounted) is moved toward its closed position, the resulting relative movement of a separate one of the strikes 2500 toward each of the latch assemblies 2100 (in the direction indicated by arrows 2600 in FIGS. 36–38) will cause each of the generally cylindrical strikes 2500 to be received in the first and second U-shaped notches 2201, 2202 of a separate one of the latch assemblies 2100. As one of the strikes 2500 enters the first and second U-shaped notches 2201, 2202, it also is received in a third U-shaped notch 2203 defined by the rotary jaw 2110 of the latch assembly 2100—and the third U-shaped notch 2203 functions in concert with the first and second U-shaped notches 2201, 2202 to receive and latchingly retain the strike 2500 in the notches 2201, 2202, 2203 when the closure 20 is closed.

A feature of the preferred practice of the present invention resides in the utilization of the second U-shaped notch 2202 (either alone or in concert with the first U-shaped notch 2201) to define a strike engagement surface (or surfaces) that is (are) directly engageable by the strike 2500. If the first and second U-shaped notches 2201, 2202 are identically configured and positioned to extend in congruent alignment, a pair of congruently aligned strike engagement surfaces 2192, 2193 (see FIG. 34) are defined by the notches 2201, 2202—which are engageable by the strike 2500 as the strike 2500 moves into and is latchingly retained within the U-shaped notches 2201, 2202. If, on the other hand, the first U-shaped notch 2201 is configured such that it is wider than the second U-shaped notch 2202 (so that the surfaces that define the first notch 2201 are positioned such that they cannot physically engage the strike 2500), the only strike engagement surface that will be defined by either of the notches 2201, 2202 is the strike engagement surface 2193 that is defined by the second U-shaped notch 2202.

By always ensuring that the strike engagement surface 2193 is defined by the second U-shaped notch 2202 (regardless of whether an additional strike engagement surface 2192 is defined by the first U-shaped notch 2201), advantage will always be taken of the close proximity presence to the second notch 2202 (and to the strike engagement surface 2193) of a transversely extending reinforcing flange 2171 that is formed integrally with the second side plate 2104 near one end thereof. A tight radius bend 2173 connects the flange to a narrow portion 2175 (see FIGS. 33 and 34) of the second side plate 2104 that extends along one side of the second notch 2202 (and that defines the strike engagement surface 2193). The close proximity presence of the transversely extending flange 2171 and the bend 2173 to the second notch 2202 (and to the strike engaging surface 2193 that is defined by the second notch 2202) strengthens and rigidifies the second housing side plate 2104 in the critical area adjacent the strike engaging surface 2193.

While the second U-shaped notch 2202 could be configured such that it is wider than the first U-shaped notch 2201 (whereby the only strike engagement surface that would be defined by either of the notches 2201, 2202 is the strike engagement surface 2192 that is defined by the first U-shaped notch 2101), this option does not conform to the preferred practice of the present invention unless the first side plate 2102 is provided with a transversely extending flange (not shown) that is substantially identical to the depicted flange 2171, but which extends from the first side plate 2102 toward the second side plate 2104 to bridge the space therebetween (instead of extending from the second side plate 2204 toward the first side plate 2102 to bridge the space therebetween, as does the depicted flange 2171).

Referring to FIG. 35, housed between the side plates 2102, 2104 are the rotary jaw 2110 and the rotary pawl 2120. The rotary jaw 2110 has a mounting hole 2111 that receives the bushing diameter 2148 therein in a slip fit to mount the rotary jaw 2110 on the bushing 2108 for limited angular movement about the transversely extending axis 2158. The rotary pawl 2120 has a mounting hole 2121 that receives the bushing diameter 2146 therein in a slip fit to mount the rotary pawl 2120 on the bushing 2106 for limited angular movement about the transversely extending axis 2156.

Also housed between the side plates 2102, 2104 is a torsion coil spring 2180 that has a first coil 2186 that extends about the diameter 2136 of the bushing 2106, and a second coil 2188 that extends about the diameter 2138 of the bushing 2108. An end 2181 of the spring 2180 engages the rotary jaw 2110 for biasing the rotary jaw 2110 in a direction of angular movement about the axis 2158 that is indicated by an arrow 2185. An opposite end 2183 of the spring 2180 engages the rotary pawl 2120 for biasing the rotary pawl 2120 in a direction of angular movement about the axis 2156 that is indicated by an arrow 2187.

Referring to FIGS. 36–38, the rotary jaw 2110 and the rotary pawl 2120 are provided with engageable formations 2113, 2123, respectively, that cooperate to "preliminarily latch" the rotary jaw 2110 in engagement with the strike 2500 (see FIG. 37) after the strike 2500 has moved only a short distance into the aligned first and second U-shaped notches 2201, 2202 during movement of the closure 20 toward its closed position.

Referring to FIG. 38, the rotary jaw 2110 and the rotary pawl 2120 also are provided with engageable formations 2115, 2123, respectively, that cooperate to "fully latch" the rotary jaw 2110 in engagement with the central region 56 of the strike 2500 after the strike 2500 has moved as far as it is going to move into the aligned first and second U-shaped notches 2201, 2202 as the closure 20 is moved to its fully closed position. When the engageable formations 2115, 2123 are engaged (as is depicted in FIG. 34) , the rotary jaw 2110 is prevented by the rotary pawl 2120 from executing unlatching movement until the rotary pawl 2120 is rotated about the axis 2156 to a pawl-releasing position wherein the engageable formations 2115, 2123 disengage to permit the rotary jaw 2110 to rotate away from its fully latched position toward its unlatched position wherein the strike 2500 is free to move out of tile third U-shaped notch 2203 that is defined by the rotary jaw 2110. This type of pawl-controlled jaw latching action is well known to those who are skilled in the art, and is further illustrated and described in a number of the patents that are identified above.

To move the rotary pawl 2120 in opposition to the action of the torsion coil spring 2180 (i.e., in a direction opposite the arrow 2187) from a pawl-retaining position (depicted in FIG. 38) to a pawl-releasing position (depicted in FIG. 36), a release lever 2700 is pivotally mounted by a rivet 2710 (see FIG. 35) on a right-angle projection 2720 of the housing side plate 2102 —which is effected by movement of an associated one of the links 1800 (each of the links 1800 connects with the release lever 2700 of a separate one of the rotary latch assemblies 2100).

Movement of the links 1800 in the direction of the arrows 1820 to effect "unlatching" of the rotary latch assemblies 2100 takes place in response to movement of the handle 1240 from its normal non-operated position shown in FIGS. 20 and 21 to its operated position shown in FIGS. 22 and 23. When the operated handle 1240 is released, it returns to its non-operated position under the influence of the spring(s) 1290 and/or 1380, hence the rearward extending projection 1250 no longer remains in the "second" position of FIG. 23 where it holds the first arm 1451 in its "secondary" position of FIG. 22. As the projection 1250 returns to the "first" position of FIGS. 20 and 21, the first arm 1451 is caused to return to its "primary" position of FIG. 20 due to the biasing action of the spring 1380, hence the links 1800 return to their normal positions of FIGS. 15 and 16 (due at least in part to the biasing action of the operating arm spring 1380) whereby the rotary latches 2100 are ready to be slammed into latching engagement with strikes 2500.

So long as the rotary jaw 2110 of the rotary latch assembly 2100 in its unlatched position (depicted in FIG. 31), the rotary jaw 2110 always can be slammed into latching engagement with the strike 2500. This is true regardless of how the relatively movable components of the operating assembly 1100 may be positioned. As the rotary jaw 2110 receives the strike 2500 within its U-shaped notch 2203, and as the strike 2500 moves into the aligned first and second U-shaped notches 2201, 2202 of the housing side plates 2102, 2104, the strike 2500 becomes cooperatively confined by the combined action of the first, second and third notches 2201, 2202, 2203. When the strike 2500 reaches the position that is depicted in FIG. 33, the rotary pawl 2120 and the rotary jaw 2110 become "preliminarily latched" (i.e., tile engagement formations 2113, 2123 engage to prevent unlocking of the rotary jaw 2110). When the strike 2500 reaches the fully latched position depicted in FIG. 34, the engagement formations 2115, 2123 engage to fully lock the closure 20 in its closed position.

Referring to FIGS. 28 and 29, to securely connect the "handle and housing assembly" or "front module" 1200 to the "bracket, latch and linkage assembly" or "rear module" 1300 (so that the assemblies 1200, 1300 will be securely retained in place on the closure 20), threaded studs 1969 are provided that project rearwardly from the back wall 1212 of the pan-shaped housing 1210 through openings 1979 that are formed through the flat wall 1312 of the mounting bracket 1310, and lock nuts 1989 are threaded onto the studs 1969 and tightened in place so that the gasket set 1120 that extends about the mounting opening 34 is compressed to form a weather tight seal as the front and rear assemblies are securely connected by the fasteners 1969, 1989. By this arrangement, the assemblies 1200, 1300 are quickly, easily and yet securely connected and fastened in place on the closure, with proper alignment and registry of the assemblies 1200, 1300 being ensured.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention. It is intended that the claims cover whatever features of patentable novelty exist in the invention disclosed.

What is claimed is:

1. A lockable handle assembly for moving operating elements of a plurality of latches to substantially concurrently operate the latches, comprising:

a) a flush mountable housing having a mounting flange that extends perimetrically about a forwardly facing recess defined by the housing;

b) a handle connected to the housing for pivotal movement relative to the housing between a non-operated position substantially nested within the recess and an operated position projecting forwardly from the recess;

c) means for selectively 1) establishing a driving connection between the handle and the operating elements of the latches for moving the operating elements to substantially concurrently operate the latches in response to pivotal movement of the handle to the operated position, and 2) disestablishing a driving connection between the handle and the operating elements of the latches for preventing no movement of the operating elements in response to pivotal movement of the handle to the operated position;

d) wherein said means includes a first arm and a second arm connected to the housing for pivotal movement relative thereto about a common pivot axis, with the first arm having a first elongate portion spaced from the common pivot axis, with the second arm having a second elongate portion spaced from the common pivot axis and overlying at least a portion of the first elongate portion, with a first elongate substantially linear slot formed in the first elongate portion, with a second elongate substantially linear slot formed in the second elongate portion, and with the second slot overlying at least a portion of the first slot;

e) means connecting the first arm to the handle for being pivoted about the common pivot axis in response to pivotal movement of the handle between the non-operated and operated positions;

f) means connecting the second arm to the operating elements of the latches for pivoting about the common pivot axis to move the operating elements to substantially concurrently operate the latches;

g) locking means connected to the housing and including a connecting element that is movable between locked and unlocked positions in response to operation the locking means, wherein the connecting element extends into the first and second slots and is operable 1) when in the unlocked position to drivingly connect the first and second arms for concurrent pivotal movement about the common pivot axis so that pivotal movement of the handle to the operated position causes the first and second arms to pivot in unison to move the operating elements of the latches to substantially concurrently operate the latches, and 2) when in the locked position to permit relative movement to take place between the first and second arms so that, when the first arm is pivoted about the common axis due to movement of the handle to the operated position, the second arm is not caused to pivot in unison with the first arm to move the operating elements to operate the latches;

h) wherein the first and second substantially linear slots are of relatively narrow, relatively uniform width along their lengths to receive the connecting element in a sliding fit therein, with each of the first and second slots being defined by a pair of substantially linear opposed side walls;

i) wherein the first and second substantially linear slots are configured to substantially align along their length when the first and second arms are in positions normally taken by the first and second arms when the handle is in the non-operated position and the operating elements of the latches have not been moved to operate the latches; and, j) wherein a selected one of the first and second arms has a corresponding one of the first and second slots configured to define a disconnect location along the length thereof wherein the opposed side walls are oriented to extend substantially perpendicular to an imaginary line that extends from the disconnect location to intersect the common pivot axis so that the opposed side walls will slide freely along opposite sides of the connecting element when the selected arm is pivoted about the common axis when the connecting element is at the disconnect location, and wherein movement of the connecting element to the locked position brings the connecting element to the disconnect location where the free sliding movement that is permitted between the opposed side walls and the opposite sides of the connecting element will permit said relative movement to take place between the first and second arms.

2. The lockable handle assembly of claim 1 wherein the locking means includes a key operated lock assembly that is operable in response to turning a key that is inserted into the lock assembly to move the connecting element between the locked and unlocked positions.

3. The lockable handle assembly of claim 2 wherein the key operated lock assembly includes a cam that is movable between a locked orientation and an unlocked orientation in response to turning of the key inserted into the lock assembly, and an elongate link that is pivotally connected to the cam near one end of the elongate link, and wherein the connecting element includes a pin formation carried near an opposite end of the elongate link and extending into the first and second slots to selectively drivingly connect the first and second arms in accordance with the positioning of the pin formation in the first and second slots by the cam and the elongate link in response to turning of the key inserted in the lock assembly.

4. The lockable handle assembly of claim 3 wherein the housing has a major back wall portion located to the rear of the forwardly facing recess, wherein the elongate link, the first arm and the second arm have relatively flat portions that overlie the major back wall portion, with the flat portion of the elongate link most closely overlying the major back wall portion, and with the flat portion of the first arm being sandwiched between the flat portion of the elongate link and the flat portion of the second arm.

5. The lockable handle assembly of claim 4 wherein the housing is defined by a front member having a first back wall that defines the rear of the forwardly facing recess, and a rear member having a second back wall that overlies the first back wall at a location behind the first back wall, and said major back wall portion is defined by the second back wall of the rear member.

6. The lockable handle assembly of claim 5 wherein the mounting flange extends in a front plane of the housing, wherein the first back wall includes a minor back wall portion that extends in a plane substantially paralleling but located between the front plane and a plane in which the first back wall extends, and wherein the locking means includes a lock cylinder that extends through a hole formed in the minor back wall portion.

7. The lockable handle assembly of claim 4 wherein the first slot is defined by the flat portion of the first arm, wherein the second slot is defined by the flat portion of the second arm, and wherein the pin formation extends rearwardly from the flat portion of the elongate link.

8. The lockable handle assembly of claim 4 wherein the first arm has first and second leg portions, wherein the first leg portion defines said flat portion of the first arm, and wherein the second leg portion defines a forwardly extending formation that is engaged by a rearwardly projecting portion of the handle, with the engagement between the forwardly extending formation and the rearwardly projecting portion providing said means connecting the first arm to the handle for pivoting the first arm about the common pivot axis in response to pivotal movement of the handle between the non-operated and operated positions.

9. The lockable handle assembly of claim 1 additionally including biasing means for biasing the operating handle toward the non-operated position.

10. The lockable handle assembly of claim 1 wherein the means connecting the second arm to the operating elements includes a T-shaped member pivotally coupled to the housing at a location between opposite ends of the T-shaped member, and pivotally connected to the second arm.

11. The lockable handle assembly of claim 10 wherein the means connecting the second arm to the operating elements additionally includes a pair of elongate links, with each of the elongate links being connected to a separate one of the opposite ends of the T-shaped member and extending toward an opposite side of the handle assembly for being moved in opposite directions in response to pivoting of the T-shaped member by the second arm to operate latches located on opposite sides of the handle assembly.

12. The lockable handle assembly of claim 1 wherein the selected one of the first and second arms is the first arm, whereby pivotal movement of the first arm due to movement of the handle to the operated position when the connecting element is in the locked position will cause no corresponding pivotal movement of the connecting element about the common axis because the opposite side walls of the first slot slip freely along the opposite sides of the connecting element during said pivotal movement of the first arm, whereby said relative movement is permitted to take place between the first and second arms.

13. The lockable handle assembly of claim 1 wherein the first and second slots are configured so that, when the connecting element is in the locked position, the first slot receives the connecting element in a first end region of the first slot and the second slot receives the connecting element in a first end region of the second slot, and said disconnect location is defined by the first end region of the selected one of the first and second arms.

14. The lockable handle assembly of claim 1 wherein:

a) the first slot has first and second opposed and regions with the first and region of the first slot being located nearer the common pivot axis that the second end region of the first slot;

b) the second slot has first and second opposed and regions with the first end region of the second slot being located nearer the common pivot axis than the second end region of the second slot; and, c) the first and second slots are configured such that the connecting element is received in the first end regions when in the locked position, and is received in the second end regions when in the unlocked position.

15. The lockable handle assembly of claim 1 wherein the first arm and the second arm are pivotally connected to the flush mountable housing by a pivot pin that extends along the pivot axis through aligned holes formed in overlying portions of the first and second arms.

16. The lockable handle assembly of claim 15 wherein the housing is defined by a front member having a first back wall that defines the rear of the forwardly facing recess, and a rear member having a second back wall that overlies the first back wall at a location behind the first back wall, and the pivot pin is connected to the second back wall.

17. The lockable handle assembly of claim 16 wherein the mounting flange extends in a front plane of the housing, wherein the first back wall includes a minor back wall portion that extends in a plane substantially paralleling but located between the front plane and a plane in which the first back wall extends, and wherein the locking means includes a lock cylinder that extends through a hole formed in the minor back wall portion.

18. The lockable handle assembly of claim 1 wherein:

a) the plurality of latches includes a rotary latch having a rotary bolt movable between latched and unlatched positions, a pawl configured to engage the rotary bolt when the rotary bolt is in the latched position to retain the rotary bolt in the latched position, and biasing means for biasing the rotary bolt toward the unlatched position and for biasing the pawl into engagement with the rotary bolt when the rotary bolt is in the latched position to retain the rotary bolt in the latched position; and, b) the operating elements include an operating element of the rotary latch that is movable to operate the rotary latch by moving the pawl in opposition to the action of the biasing means to disengage the rotary bolt to permit the rotary bolt to move under the influence of the biasing means to the unlatched position.

19. The lockable handle assembly of claim 1 wherein:

a) the first arm is pivotably about the common pivot axis between a primary position normally assumed by the first arm when the Handle is in the non-operated position, and a secondary position normally assumed by the first arm when the handle is moved to the operated position;

b) the handle has a rearwardly extending formation that extends through an opening defined by the housing at the rear of the forwardly facing recess and into engagement with the first arm to pivot the first arm from the primary position to the secondary position in response to movement of the handle from the non-operated position to the operated position; and, c) spring means is provided for biasing the first arm toward the primary position and for biasing the handle toward the non-operated position.

20. The lockable handle assembly of claim 19 wherein the spring means is a torsion coil spring that has a coiled portion that extends about the common pivot axis, with one end region of the torsion coil spring being connected to the first arm, and with an opposite end region of the torsion coil spring being connected to the housing.

21. A lockable handle assembly for moving at least one operating element of at least one latch to operate the at least one latch, comprising:

a) a flush mountable housing having a mounting flange that extends perimetrically about a forwardly facing recess defined by the housing;

b) a handle connected to the housing for pivotal movement relative to the housing between a non-operated position substantially nested within the recess and an operated position projecting forwardly from the recess;

c) means for selectively 1) establishing a driving connection between the handle and the at least one operating element of the at least one latch for moving the at least one operating element to operate the at least one latch in response to pivotal movement of the handle to the operated position, and 2) disestablishing a driving connection between the handle and the at least one operating element of the at least one latch for preventing movement of the at least one operating element in response to pivotal movement of the handle to the operated position;

d) wherein said means includes a first arm and a second arm connected to the housing for pivotal movement relative thereto about a common pivot axis, with the first arm having a first elongate portion spaced from the common pivot axis, with the second arm having a second elongate portion spaced from the common pivot axis and overlying at least a part of the first elongate portion, with a first elongate substantially linear slot formed in the first elongate portion, with a second elongate substantially linear slot formed in the second elongate portion, and with the second elongate substantially linear slot at least partially overlying the first elongate substantially linear slot;

e) means connecting the first arm to the handle for being pivoted about the common pivot axis in response to pivotal movement of the handle between the nonoperated and operated positions;

f) means connecting the second arm to the at least one operating element of the at least one latch for moving the at least one operating element to operate the at least one latch in response to pivotal movement of the second arm about the common pivot axis;

g) locking means connected to the housing and having a connecting element that extends into the first and second slots and is movable between 1) an unlocked position wherein the connecting element is operable to drivingly connect the first and second arms for concurrent pivotal movement about the common pivot axis so that pivotal movement of the handle to the operated position causes the first and second arms to pivot in unison to move the at least one operating element of the at least one latch to operate the at least one latch, and 2) a locked position wherein the connecting element cooperates with the first and second slots to permit relative movement to take place between the first and second arms so that, when the first arm is pivoted about the common axis due to movement of the handle to the operated position, the second arm is not caused to pivot in unison with the first arm to move the at least one operating element to operate the at least one latch;

h) wherein the first and second substantially linear elongate slots are of relatively narrow width along their lengths to receive the connecting element in a sliding fit therein, with each of the first and second substantially linear elongate slots being defined by a separate pair of substantially linear opposed side walls;

i) wherein the first and second substantially linear elongate slots are configured to substantially align along their lengths during said relative movement when the first and second arms are in positions normally taken by the first and second arms when the handle is in the non-operated position and the operating element of the at least one latch has not been moved to operate the at least one latch; and, j) wherein the first and second slots are configured so that, when the connecting element is in the locked position, the connecting element resides within a disconnect portion of the first slot wherein the opposed side walls of the first slot are oriented to extend substantially perpendicular to an imaginary line that extends from the disconnect location to intersect the common pivot axis so that the opposed side walls will slide freely along opposite sides of the connecting element when the first arm is pivoted about the common axis when the connecting element is at the disconnect location to permit said relative movement to take place between the first and second arms.

22. The lockable handle assembly of claim 21 wherein the locking means includes a key operated lock assembly that is operable in response to turning a key that is inserted into the lock assembly to move the connecting element between the locked and unlocked positions.

23. The lockable handle assembly of claim 22 wherein the key operated lock assembly includes a cam that is movable between a locked orientation and an unlocked orientation in response to turning of the key inserted into the lock assembly, and an elongate link that is pivotally connected to the cam near one end of the elongate link, and wherein the connecting element includes a pin formation carried near an opposite end of the elongate link and extending into the first and second slots to selectively drivingly connect the first and second arms in accordance with the positioning of the pin formation in the first and second slots by the cam and the elongate link in response to turning of the key inserted in the lock assembly.

24. The lockable handle assembly of claim 23 wherein the housing has a major back wall portion located at the rear of the forwardly facing recess, wherein the elongate link, the first arm and the second arm have relatively flat portions that overlie the major back wall portion, with the flat portion of the elongate link most closely overlying the major back wall portion, and with the flat portion of the first arm being sandwiched between the flat portion of the elongate link and the flat portion of the second arm.

25. The lockable handle assembly of claim 24 wherein the housing is defined by a front member having a first back wall that defines the rear of the forwardly facing recess, and a rear member having a second back wall that overlies the first back wall at a location behind the first back wall, and said major back wall portion is defined by the second back wall of the rear member.

26. The lockable handle assembly of claim 25 wherein the mounting flange extends in a front plane of the housing, wherein the first back wall includes a minor back wall portion that extends in a plane substantially paralleling but located between the front plane and a plane in which the first back wall extends, and wherein the locking means includes a lock cylinder that extends through a hole formed in the minor back wall portion.

27. The lockable handle assembly of claim 24 wherein the first slot is defined by the flat portion of the first arm, wherein the second slot is defined by the flat portion of the second arm, and wherein the pin formation extends rearwardly from the flat portion of the elongate link.

28. The lockable handle assembly of claim 24 wherein the first arm has first and second leg portions, wherein the first leg portion defines said flat portion of the first arm, and wherein the second leg portion defines a forwardly extending formation that is engaged by a rearwardly projecting portion of the handle, with the engagement between the forwardly extending formation and the rearwardly projecting portion providing said means connecting the first arm to the handle for pivoting the first arm about the common pivot axis in response to pivotal movement of the handle between the non-operated and operated positions.

29. The lockable handle assembly of claim 21 wherein the means connecting the second arm to the operating elements includes a T-shaped member pivotally coupled to the housing at a location between opposite ends of the T-shaped member, and pivotally connected to the second arm.

30. The lockable handle assembly of claim 29 wherein the means connecting the second arm to the operating elements additionally includes a pair of elongate links, with each of the elongate links being connected to a separate one of the opposite ends of the T-shaped member and extending toward an opposite side of the handle assembly for being moved in opposite directions in response to pivoting of the T-shaped member by the second arm to operate latches located on opposite sides of the handle assembly.

31. The lockable handle assembly of claim 21 additionally including biasing means for biasing the operating handle toward the non-operated position.

32. The lockable handle assembly of claim 21 wherein:

a) the first slot has first and second opposed end regions with the first end region of the first slot being located nearer the common pivot axis than the second end region of the first slot;

b) the second slot has first and second opposed end regions with the first end region of the second slot being located nearer the common pivot axis than the second end region of the second slot; and, c) the first and second slots are configured such that the connecting element is received in the first end regions when in the locked position, and is received in the second end regions when in the unlocked position.

33. The lockable handle assembly of claim 32 wherein the disconnect portion of the first slot is defined by the first end region of the first slot.

34. The lockable handle assembly of claim 33 wherein the first end region of the first slot is located nearer the common pivot axis than the second end region of the first slot, and the first end region of the second slot is located nearer the common pivot axis than the second end region of the second slot.

35. The lockable handle assembly of claim 21 wherein the first arm and the second arm are pivotally connected to the flush mountable housing by a pivot pin that extends along the pivot axis through aligned holes formed in overlying portions of the first and second arms.

36. The lockable handle assembly of claim 35 wherein the flush mountable housing has a back wall located to the rear of the forwardly facing recess, and the pivot pin has one end region connected to the back wall.

37. The lockable handle assembly of claim 21 wherein:

a) the plurality of latches includes a rotary latch having a rotary bolt movable between latched and unlatched positions, a pawl configured to engage the rotary bolt when the rotary bolt is in the latched position to retain the rotary bolt in the latched position, and biasing means for biasing the rotary bolt toward the unlatched position and for biasing the pawl into engagement with the rotary bolt when the rotary bolt is in the latched position to retain the rotary bolt in the latched position; and, b) the operating elements include an operating element of the rotary latch that is movable to operate the rotary latch by moving the pawl in opposition to the action of the biasing means to disengage the rotary bolt to permit the rotary bolt to move under the influence of the biasing means to the unlatched position.

38. The lockable handle assembly of claim 21 wherein:

a) the first arm is pivotably about the common pivot axis between a primary position normally assumed by the first arm when the handle is in the non-operated position, and a secondary position normally assumed by the first arm when the handle is moved to the operated position;

b) the handle has a rearwardly extending formation that extends through an opening defined by the housing at the rear of the forwardly facing recess and into engagement with the first arm to pivot the first arm from the primary position to the secondary position in response to movement of the handle from the non-operated position to the operated position; and, c) spring means is provided for biasing the first arm toward the primary position and for biasing the handle toward the non-operated position.

* * * * *

UNITED STATES PATENT AND TRADEMARK OFFICE

CERTIFICATE OF CORRECTION

PATENT NO. : 6,513,353 B1
DATED : February 4, 2003
INVENTOR(S) : Weinerman et al.

It is certified that error appears in the above-identified patent and that said Letters Patent is hereby corrected as shown below:

Title page,
Item [57], ABSTRACT,
Line 6, delete "arm" and substitute -- arms --

Column 3,
Line 61, delete "Wilether" and substitute -- Whether --

Column 4,
Lines 11 and 46, delete "tile" and substitute -- the --

Column 5,
Line 21, delete "lousing" and substitute -- housing --
Lines 54, 59, 60 and 62, delete "tile" and substitute -- the --

Column 6,
Line 3, do not start a new paragraph

Column 8,
Line 41, delete "vies" and substitute -- view --
Line 52, delete "taker" and substitute -- taken --

Column 10,
Line 29, delete "145" and substitute -- 146 --

Column 13,
Line 24, delete "rigidities" and substitute -- rigidifies --
Line 35, delete "tile" and substitute -- the --

Column 18,
Lines 29 and 33, delete "tile" and substitute -- the --

Column 28,
Line 58, delete "and" and substitute -- end --

UNITED STATES PATENT AND TRADEMARK OFFICE
CERTIFICATE OF CORRECTION

PATENT NO. : 6,513,353 B1
DATED : February 4, 2003
INVENTOR(S) : Weinerman et al.

It is certified that error appears in the above-identified patent and that said Letters Patent is hereby corrected as shown below:

Column 29,
Line 38, delete “Handle” and substitute -- handle --

Signed and Sealed this

Fourteenth Day of October, 2003

JAMES E. ROGAN
*Director of the United States Patent and Trademark Office*